United States Patent
Fallon et al.

(10) Patent No.: US 11,794,424 B2
(45) Date of Patent: Oct. 24, 2023

(54) DIE, DIE ASSEMBLY, EQUIPMENT AND METHOD FOR FORMING RODS OF FIBROUS MATERIAL

(71) Applicant: British American Tobacco (Investments) Limited, London (GB)

(72) Inventors: Gary Fallon, London (GB); Arnold Herholdt, Stellenbosch (ZA); Gerhard Le Roux, Stellenbosch (ZA); John Richardson, London (GB)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 842 days.

(21) Appl. No.: 16/496,564

(22) PCT Filed: Mar. 15, 2018

(86) PCT No.: PCT/GB2018/050668
§ 371 (c)(1),
(2) Date: Sep. 23, 2019

(87) PCT Pub. No.: WO2018/172743
PCT Pub. Date: Sep. 27, 2018

(65) Prior Publication Data
US 2020/0108570 A1  Apr. 9, 2020

(30) Foreign Application Priority Data

Mar. 24, 2017 (GB) .................................. 1704692
Mar. 24, 2017 (GB) .................................. 1704700

(51) Int. Cl.
*B29C 70/50* (2006.01)
*A24B 3/14* (2006.01)
(Continued)

(52) U.S. Cl.
CPC .......... *B29C 70/523* (2013.01); *A24D 3/0291* (2013.01); *B29B 15/122* (2013.01);
(Continued)

(58) Field of Classification Search
CPC ... B29C 70/523; B29C 70/521; B29C 70/526; B29C 70/528; A24D 3/0291
See application file for complete search history.

(56) References Cited

U.S. PATENT DOCUMENTS 3,095,343 A * 6/1963 Berger ................. A24D 3/0233
28/283
3,309,734 A * 3/1967 Bynum .................. D01D 5/423
264/176.1
(Continued)

FOREIGN PATENT DOCUMENTS

EP 0224892 A1 6/1987
EP 2548625 A1 1/2013
(Continued)

OTHER PUBLICATIONS

Russian Search Report for corresponding application 2019129856/05 filed Mar. 15, 2018; Report dated Mar. 25, 2020.
(Continued)

*Primary Examiner* — Matthew J Daniels
(74) *Attorney, Agent, or Firm* — CANTOR COLBURN LLP

(57) ABSTRACT

A die or die assembly for forming a bundle of fibres into a rod or tube comprises a body (84) defining a passage 86) for conducting the bundle fibres through the die from an inlet to an outlet, a constriction (91) in the passage having an entrance shaped to form the fibres of the bundle into a desired configuration as the bundle passes through the die, and one or more conduits (92) through which a treatment fluid e.g. steam, for curing the bundle of fibres may be
(Continued)

introduced into the passage, and wherein at last one conduit is arranged to discharge fluid in the immediate vicinity of the entrance to the constriction to facilitate passage of the fibres through the die and reduce the risk of blockage.

23 Claims, 16 Drawing Sheets

(51) Int. Cl.
  B29C 70/52 (2006.01)
  B29B 15/12 (2006.01)
  A24D 3/02 (2006.01)
  B29K 101/12 (2006.01)
  B29K 105/08 (2006.01)
  B29L 31/14 (2006.01)

(52) U.S. Cl.
  CPC .......... *A24D 3/0237* (2013.01); *B29C 70/521* (2013.01); *B29C 70/526* (2013.01); *B29C 70/528* (2013.01); *B29K 2101/12* (2013.01); *B29K 2105/08* (2013.01); *B29L 2031/14* (2013.01)

(56) References Cited

U.S. PATENT DOCUMENTS

| | | | |
|---|---|---|---|
| 3,684,622 A | | 8/1972 | Goldsworthy |
| 3,774,508 A | * | 11/1973 | Berger ............... A24D 3/0283 493/47 |
| 3,802,817 A | | 4/1974 | Matsuki |
| 3,826,177 A | | 7/1974 | Berger |
| 4,286,005 A | | 8/1981 | Berger |
| 4,340,563 A | | 7/1982 | Appel |
| 4,508,525 A | | 4/1985 | Berger |
| 4,549,875 A | | 10/1985 | Pryor |
| 4,812,112 A | | 3/1989 | Balk |
| 5,382,153 A | | 1/1995 | Nettelnstroth |
| 5,911,224 A | | 6/1999 | Berger |
| 6,059,706 A | * | 5/2000 | Chehab ............... A24D 3/0233 493/44 |
| 6,499,981 B1 | | 12/2002 | Yoshida |
| 7,132,071 B2 | | 11/2006 | Smith |
| 8,591,683 B2 | | 11/2013 | Fox |
| 2003/0222372 A1 | * | 12/2003 | Ward ............... B43K 8/03 264/122 |
| 2004/0238991 A1 | | 12/2004 | Smith |
| 2005/0008728 A1 | | 1/2005 | Wilkie |
| 2011/0293764 A1 | | 12/2011 | Hartge |
| 2013/0023395 A1 | * | 1/2013 | Nakamura ............... A24D 3/04 493/328 |
| 2014/0243178 A1 | | 8/2014 | Matern |

FOREIGN PATENT DOCUMENTS

| | | |
|---|---|---|
| EP | 2641484 A2 | 9/2013 |
| GB | 1526151 | 9/1978 |
| JP | 52104577 | 9/1977 |
| RU | 53290 U1 | 5/2006 |
| UA | 28376 U | 12/2007 |
| WO | 9516369 A1 | 6/1995 |
| WO | 0141590 A1 | 6/2001 |
| WO | 03085185 A2 | 10/2003 |
| WO | 2004104485 A2 | 12/2004 |
| WO | 2011114440 A1 | 9/2011 |
| WO | 2015011830 A1 | 1/2015 |
| WO | 2015028812 A1 | 3/2015 |
| WO | 2016097016 A1 | 6/2016 |
| WO | 2018172742 A1 | 9/2018 |

OTHER PUBLICATIONS

British Search Report for corresponding application GB1704692.1: Report dated Jun. 8, 2017.
British Search Report for corresponding application GB1704700.2; Report dated Jun. 22, 2017.
Demand for International Preliminary Examination for corresponding application PCT/GB2017/052766 filed Sep. 18, 2017; dated Jul. 30, 2018.
International Preliminary Report on Patentability for corresponding applicating PCT/GB2018/050668 filed Mar. 15, 2018; dated Apr. 11, 2019.
International Preliminary Report on Patentability for corresponding application PCT/GB2017/052766 filed Sep. 18, 2017; dated Jan. 28, 2019.
International Preliminary Report on Patentability for corresponding application PCT/GB2018/050661 filed Mar. 15, 2018; dated Jun. 25, 2019.
International Search Report for corresponding applicating PCT/GB2018/050668 filed Mar. 15, 2018; dated Jun. 13, 2018.
International Search Report for corresponding application PCT/GB2017/052766 filed Sep. 18, 2017; dated Dec. 7, 2017.
International Search Report for corresponding application PCT/GB2018/050661 filed Mar. 15, 2018; dated Jun. 7, 2018.
International Search Report for corresponding application PCT/GB2018/050670 filed Mar. 15, 2018; dated Jun. 6, 2018.
Written Opinion of the International Searching Authority for corresponding applicating PCT/GB2018/050668 filed Mar. 15, 2018; dated Jun. 13, 2018.
Written Opinion of the International Searching Authority for corresponding application PCT/GB2017/052766 filed Sep. 18, 2017; dated Dec. 7, 2017.
Written Opinion of the International Searching Authority for corresponding application PCT/GB2018/050661 filed Mar. 15, 2018; dated Jun. 7, 2018.
Written Opinion of the International Searching Authority for corresponding application PCT/GB2018/050670 filed Mar. 15, 2018; dated Jun. 6, 2018.
Chinese Search Report for corresponding application 201880034418.0 filed Mar. 15, 2018; Report dated Apr. 2, 2021.

* cited by examiner

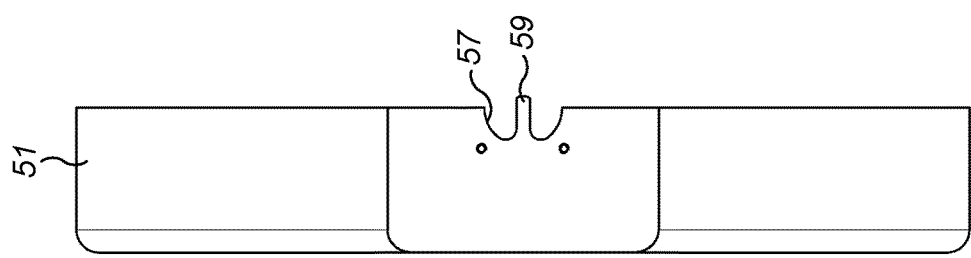
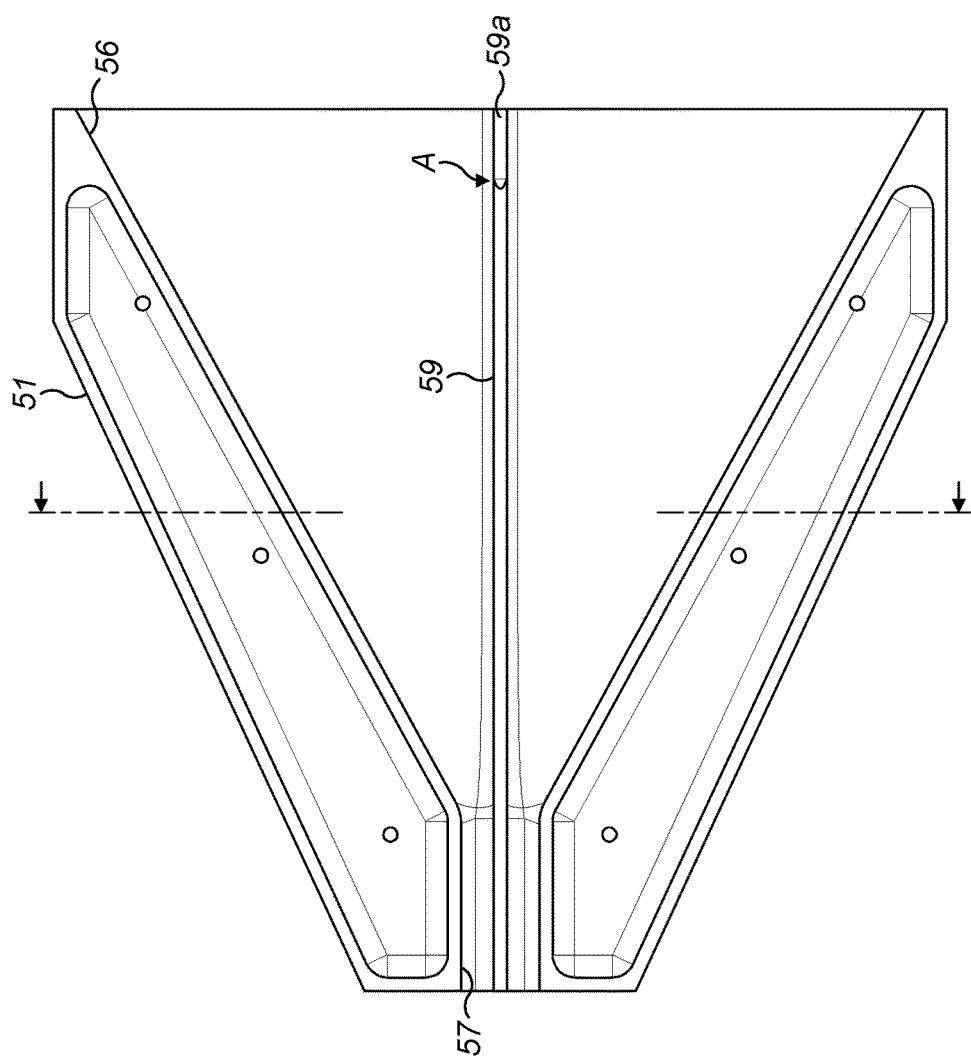
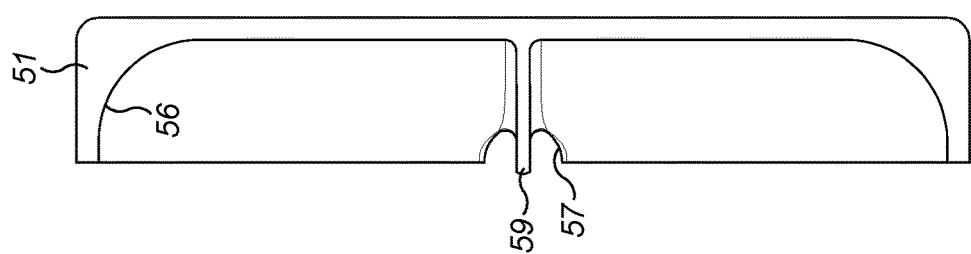

DIE, DIE ASSEMBLY, EQUIPMENT AND METHOD FOR FORMING RODS OF FIBROUS MATERIAL

FIELD OF THE INVENTION

This patent specification relates to methods and equipment for forming rods of fibrous material, in particular filter rods for use in cigarettes

BACKGROUND

Rods of fibrous material can be formed by gathering fibres into an elongated bundle, passing the gathered fires through a die to compress or otherwise form the fibres into a rod of desired shape and size, and then curing the fibres by exposing the fibres to a treatment fluid in order to fix the bundle of fibres in a desired form. For example, if the fibres are composed of a thermoplastics material that can be softened by the application of heat, the rod can be cured e.g. by contacting the fibres in the die with steam at a temperature sufficient to fuse the fibres together at their points of contact to form a stable structure.

This technique can be used to produce rods of solid cross section, or tubular rods. In order to form tubular rods, a die assembly may be used that includes a die and a mandrel around which the fibres can be formed into a tubular shape. For example, the die may have a central passage there through, and the mandrel may be positioned within the central passage to define an annular space between the die and the mandrel through which the bundle of fibres is passed.

The starting material for the production of rods or tubes is a relatively low density fibrous bundle, such as a fibrous tow. In order to produce rods or tubes of high density at high speeds, high feed rates and compressive forces are required in the die assembly to form the product, as a result of which the manufacturing process is prone to failure due to blockages within the die assembly.

SUMMARY

This specification discloses a method of forming a bundle of fibres into a rod that broadly comprises gathering fibres into an elongated bundle, advancing the bundle through a constriction that defines a desired circumferential profile for the bundle of fibres, and introducing into the bundle a treatment fluid for curing the fibres as the fibres enter the constriction, and/or in a direction that is not opposed to the direction in which the bundle of fibres is advanced through the die.

The introduction of the treatment fluid at or near the entrance to the constriction the die can facilitate the compression and shaping of the fibres, especially in the case of the manufacture of tubular rods.

The formation of the fibres may also be facilitated by introducing the treatment fluid in a direction that is not opposed to the direction of movement of the bundle through the constriction.

This specification also discloses a die and the use thereof to form a bundle of fibres into a rod, in which the die comprises a body that defines a passage through the die from an inlet to an outlet; a constriction in the passage having an entrance shaped to form the fibres of the bundle into a desired configuration as the bundle passes through the die; and one or more conduits through which a treatment fluid for curing the bundle of fibres may be introduced into the passage; and wherein the or at least one of the conduits is arranged to discharge fluid in the immediate vicinity of the entrance to the constriction and/or in a direction that is not opposed to the direction of movement of the bundle of fibres through the die.

This specification also discloses equipment for forming a bundle of fibres into a rod that comprising gathering equipment constructed to receive a continuous supply of fibres and to gather the fibres into a bundle as the fibres advance through the equipment, and a die as disclosed herein arranged to receive the bundle of fibres and to form the bundle into a rod.

A die as disclosed herein may be incorporated in a die assembly comprising a die and other components. For example, the die assembly may additionally comprise structural components by means of which treatment fluid may be supplied to the die. Alternatively, or additionally, the die assembly may comprise structural components for heating the die.

In one embodiment, a die assembly comprises a housing defining a chamber into which a treatment fluid may be introduced, and a die as disclosed herein mounted in the chamber, wherein the or least one of the conduits communicates between the chamber and the passage, whereby the fluid may be introduced into the passage from the chamber in the immediate vicinity of the entrance to the constriction.

The treatment fluid may be a hot fluid, for example steam or water vapour or a heated gas or vapour. The die may be mounted in the assembly so that the body of die conducts heat from the chamber to the passage through the die. For example, the chamber may be constructed to form a jacket around the die so that the die may be heated by introducing a hot fluid into the chamber. The die may be composed of metal or other heat-conducting material, and may be mounted to conduct heat through the body of the die to the passage.

In one embodiment, the passage through the die includes an inlet section, which includes the inlet to the passage, and a forming section that includes the constriction, and the entrance to the constriction is at a junction between the forming section and the inlet section.

The forming section will generally extend downstream from the constriction and may be shaped to maintain the fibre bundle in a desired shape size or configuration whilst the fibre bundle is cured. The forming section may be configured to compress the fibres radially into a desired configuration and to retain the fibres in a compressed state as the bundle of fibres is advanced through the die. The forming section may for example define a region of smaller cross-sectional area than the inlet.

In some embodiments, the passage through the die may further comprise an outlet section that includes the outlet from the passage and communicates with the section of the passage that includes the constriction. The outlet section will generally extend downstream from the forming section and may be shaped to guide or support the cured fibre bundle between the forming section and the outlet. The outlet section may define a circumferential profile equal to or larger than that defined by the constriction in the forming section. Where the outlet section has a larger internal circumferential profile than the forming section, the rod formed in such an embodiment has less contact with the walls of the outlet section of the die, and may therefore cool more quickly after contact with the treatment fluid in the forming section.

In one embodiment, the inlet section defines part of the passage that extends from the inlet to the entrance to the constriction, the forming section defines part of the passage that extends from the entrance towards the outlet and incorporates the constriction, and the optional outlet section defies part of the passage that extends from the forming section to the outlet, The die may be configured to transfer heat through the die in selected proportions to sections of the passage, in particular the inlet section, the forming section, the outlet section and combinations thereof. For example, in one embodiment the die may be configured to transfer heat to the passage primarily through the forming section, or a section of the passage that includes the constriction. In another embodiment, the die may be configured to transfer heat to the passage primarily through sections of the passage that include the constriction and the inlet, or through both the forming section and the inlet section. In another embodiment, the die may be configured to transfer heat to the passage primarily through both the forming section and the outlet section, or through the sections of the passage that include the constriction and the outlet.

The transfer of heat in desired proportions to different sections of the passage may be achieved by selecting the relative lengths of the inlet, forming and outlet sections to provide desired relative rates of transfer of heat, as appropriate for the particular fibres used in the manufacture of the rod or tube. In one embodiment, the inlet section may be of greater axial length than the forming section. For example, the ratio of the lengths of the forming section to the inlet section may be in the range of from 1:1 to 1:5 or more, e.g. in the following ranges:—1:1-1:2, 1:1-1:2.5, 1:1-1:3, 1:1-1:3.5, 1:1-1:4, or 1:1-1:1.5.

In other embodiments, the outlet section may be equal to or shorter than the forming section. For example, the ratio of the length of the forming section to the length of the outlet section may be in the range of from 1:1 to 1:0.1, e.g. in the following ranges:—1:1-1:0.1, 1:1-1:0.2, 1:1-1:0.4, 1:1-1:0.6, 1:1-1:0.8, or 1:1-1:0.9. In some embodiments, the outlet section may be longer than the forming section. For example, the ratio of the lengths of the forming section to the outlet section may be in the range of from 1:1 to 1:5 or more e.g. in the following ranges:—1:1-1:2, 1:1-1:2.5, 1:1-1:3, 1:1-1:3.5, or 1:1-1.4, or 1:1-1:1.5.

The proportion of heat to the individual sections of the die may also be varied selectively by applying or removing external heat to the different sections at different temperatures, for example by externally heating or by cooling the individual sections at different rates, or by using different materials for the different sections of the die, or by insulating the sections differentially.

The inlet section, or at least part thereof, may taper towards the constriction at the entrance of the forming section in order to gather the fibres and to direct the bundle into the forming section. The cone angle of the tapered section (i.e. the vertex angle of the cone on which the tapered internal surface of the inlet section lies) affects the resistance to the axial movement of the fibre through the die. Surfaces with smaller cone angles provide less resistance, but extend over a greater length and may be more difficult to package in the available space within the die assembly or equipment. The tapered section may be provided, for example, with a cone angle in the range from and to any of the following: 10°, 20°, 25°, 30°, 35°, 40°, 50°, 60°, 70°, 75°, 80°, 85°, 90°, 120°, 140°, or 160° up to 180° The same characteristic can be described in terms of the semi-cone angle of the tapered section, namely the angle between the central axis of the passage and a line on the inner surface of the inlet in the same axial plane. The semi-cone angles will have half the values of the corresponding cone angles, i.e. in a range from and to any of the following values: 5°, 10°, 15°, 20°, 25°, 35°, 40°, 45° etc. up to 90°.

At least one of the conduits in the die, usually more than one, is arranged to discharge fluid in the immediate vicinity of the entrance to the constriction. Delivery of treatment fluid to regions in the passage in which the fibre bundle is subjected to constriction can improve the flow of fibres through the die, for example as a result of plasticisation of the fibres, lubrication, improved heat transfer, or kinetic assistance to the flow of material through the constriction.

The outlets from the conduits may be positioned at the entrance of the constriction, for example at a point along the axial length of the passage that coincides with the region at which the fibre bundle is constricted to its desired configuration as it passes through the die, e.g. at the entrance to the forming section. Alternatively, the conduit outlets may be positioned by or beside the entrance to the constriction, for example marginally upstream or marginally downstream thereof. The optimum location of the outlets of the conduit relative to the entrance to the forming section will vary according to such factors as the size of the die, the number of conduits, the relative size of the conduit and the forming section of the die. The outlets should be sufficiently close to the entrance to deliver the steam of other curing fluid to the fibres as they pass through the entrance.

The positioning of the outlets in the immediate vicinity of the entrance delivers fluid, for example steam, into the fibre bundle at the point at which compressive forces on the bundle are highest. These compressive forces may impede the passage of fibres through the entrance and into the die, and cause the fibre bundle to back up of even block the die immediately upstream of the entrance to the die. By directing the treatment fluid into the die in this region, the passage of the fibres into and through the die is facilitated, and incidences of blockage may be reduced.

The proximity of an outlet to the entrance may be quantified by expressing the distance between the centre of the outlet, where it intersects with the passage of the die, and the entrance to the forming section as a percentage of the length of the forming section:

As an indication, if the centre of the outlet coincides with the entrance to the forming section, the proximity will be zero. If the centre of the outlet is upstream of downstream of the entrance, the proximity will typically be from 0 to 20% of the length of the forming section, for example 0-20%, 0-18%, 0-15%, 0-12%, 0-10%, 0-8%, 0-5% or 0-3% thereof.

The proximity of an outlet to the entrance may also be quantified by expressing the axial distance along the passage between the centre of the outlet and the entrance to the forming section as a multiple of the width of the conduit. For example, if the centre of the outlet coincides with the entrance to the forming section, the proximity of the outlet to the centre will be zero. If the centre of the outlet is spaced from the entrance in the upstream or downstream directions, the distance between the centre of the outlet and the entrance to the constriction may for example be up to 0.5, 1, 1.5, 2. 2.5, 3, 3.5, 4 or 5, 6, 7, 8, 9, 10, 12, 15, 18, 20 times the width or cross-sectional diameter of the conduit at the outlet.

The formation of the fibres into a rod or tube may also be facilitated if the treatment fluid is introduced in a direction that is not opposed to the direction of movement of the bundle through the constriction. For example, the outlet of the conduit may be arranged to discharge fluid into the passage through the die in a direction generally radially, or generally at right angles, to the axis of the passage, or the conduit may be arranged to discharge fluid into the passage at an acute angle to the axis of the passage, for example at an angle not significantly greater than 90° to the direction of movement of the bundle of fibres through the die, possibly 10, 20, 30, 40, 50, 60, 70, or 80 degrees to the direction of movement. In these configurations, the outlet of the conduit directs the fluid generally in the downstream direction, towards the outlet of the passage. If directed at angles marginally greater than 90° (e.g. up to 95-100° to the direction of movement, the fluid flow still may not significantly oppose the movement of the bundle of fibres through the die, and the kinetic energy of the stream of fluid may still assist the compression and shaping of the bundle of fibres and the movement of the fibres through the die. At directions significantly greater than 90°, e.g. from 100 to 180°, a significant component of the force exerted on the fibre by the bundle will be contrary to the movement of the fibre bundle through the constriction and will oppose compression and shaping of the fibre bundle.

The precise optimum configuration of the conduits in the vicinity of the constriction, or at or by the constriction will depend upon the configuration of the die assembly itself at this point, and the configuration of the passage through the die assembly and any mandrel present.

Further conduits may be provided through which a fluid may be introduced into the passage for treating fibres at another point in the passage, upstream or downstream of the entrance to the forming section. In particular, one or more further conduits may be provided to discharge fluid into the inlet section upstream of the constriction so as to perform preliminary treatment of the fibres before they enter the constriction, for example to increase the plasticity of the fibres. In one embodiment, the inlet section includes an upstream section and a downstream section of smaller cross-sectional area than the upstream section, and the further conduits are constructed and arranged to discharge fluid into passage in the vicinity of the junction between the upstream and downstream sections.

For the manufacture of tubes, the die or die assembly may further comprise a mandrel positioned the path of the fibres to form the fibres in a tubular configuration around the mandrel as the bundle of fibres advances over the mandrel. The mandrel may be positioned in the passage in the die so that, as the bundle is advanced over the mandrel, it is formed into a tubular configuration. The constriction may then be formed in the annular space between the mandrel and the wall of the passage, which has a reduced cross-sectional area compared with the that of the passage.

The mandrel may be of uniform radial cross section and mounted coaxially within the passage to extend partially through the passage to constrict the passage along part of the length of the passage. In another embodiment, the mandrel may be provided with a segment of its length having a larger cross-section than an adjacent segment, so that the segment of larger cross section constricts the passage more than the adjacent section.

In one embodiment, the mandrel is mounted in a mandrel assembly adjacent the die and projects therefrom into the passage in the die, and the mandrel assembly is configured to direct the bundle of fibres on to the mandrel and into the passage in the die assembly. When incorporated in manufacturing equipment for forming rods, the mandrel assembly may be positioned in the path of the fibre bundle upstream of the die assembly, and the mandrel may project therefrom downstream into the passage through the die assembly.

Where the equipment includes a mandrel, one or more of the conduits may be provided within the mandrel for delivering the treatment fluid to the fibre bundle as the bundle passes over the mandrel. For example, the mandrel may be provided with a passage having an inlet for the introduction of the treatment fluid and an outlet communicating with surface of the mandrel.

Accordingly, the disclosure of this specification specifically includes equipment for forming a tubular rod of fibrous material comprising a mandrel constructed to form a passage through the bundle of fibres as the bundle of fibres advances over the mandrel, wherein the mandrel is provided with a passage having an inlet for the introduction of the treatment fluid and an outlet communicating with surface of the mandrel.

This specification also discloses a method of forming a tubular rod of fibrous material comprising gathering fibres into an elongated bundle, closing the fibres of the bundle around the mandrel in a tubular configuration, and separating the fibres from the mandrel as a tubular rod, wherein a treatment fluid is introduced into the bundle through the mandrel.

The formation of the fibres into a rod or tube around the mandrel may be further facilitated if the treatment fluid is introduced in a direction that is not opposed to the direction of movement of the bundle over the mandrel. For example, the passage in the mandrel may be arranged to discharge fluid in a direction generally radially, or generally at right angles to the direction of movement of the fibres over the mandrel, or at an acute angle thereto, for example at an angle not significantly greater than 90° to the direction of movement of the bundle of fibres, possibly 10, 20, 30, 40, 50, 60, 70, or 80 degrees to the direction of movement. In these configurations, the fluid is directed into the fibre bundle generally in the downstream direction of movement. Even if directed at angles marginally greater than 90° (e.g. up to 95° to the direction of movement), the fluid flow may not significantly oppose the movement of the bundle of fibres over the mandrel, and the kinetic energy of the stream of fluid may still assist the compression and shaping of the bundle of fibres around and over the mandrel. At directions significantly greater than 90°, e.g. from 100 to 180°, a component of the force exerted on the fibres by the fluid will become significantly contrary to the movement of the fibre bundle over the mandrel and will be less beneficial to the compression and shaping of the fibre bundle.

The flow of fibres over the mandrel to form a tube may be improved by providing a divider in the path of the fibres and constructed to from a cleft along the length of the bundle of fibres as it advances towards the mandrel and the die assembly. The gathered fibres of the elongated bundle are parted to form a cleft along the length of the bundle, the mandrel is introduced into the cleft, the fibres of the bundle are closed around the mandrel in a tubular configuration, the bundle is advanced through the die whilst supported on the mandrel, the fibres are cured, and the bundle of fibres is removed from the mandrel as a tubular rod.

The formation of a cleft in the fibrous bundle prior to introduction of the mandrel facilitates the formation of a tube, and reduces the risk of failure as a result of misalignment of the mandrel with the bundle of fibres. The cleft may divide the bundle into separate parts, e.g. two distinct bundles, or, alternatively the cleft may be in the form of a recess extending partially through the bundle, for example 20%, 30%, 40%, 50% 60%, 70% or 80% through the thickness of the bundle.

The divider may comprise a wall, pin, blade, plough or other formation mounted in the path of the fibres through the equipment, upstream of the mandrel. The divider may be shaped at its upstream end to facilitate the formation of a cleft in the bundle fibres, for example presenting a curved or v-shaped face or edge to the bundle of fibres.

In one embodiment, the die and die assembly are used in equipment for forming a bundle of fibres into a rod comprising a gathering station constructed to receive a continuous supply of fibres and to gather the fibres into a bundle as the fibres advance through the equipment. The equipment may include a forming cone, which defines a longitudinally extending passage of tapering configuration between an inlet for receiving the fibres and an outlet from which the web of fibres may be withdrawn as a bundle. In this embodiment, a divider may be positioned within the passage to project across the outlet to form a longitudinally extending cleft in the bundle of fibres.

The method and equipment disclosed herein may be used to process fibres from a feedstock of fibrous material, e.g. a bale of fibre tow, or from fibres supplied directly from a continuous manufacturing process or equipment, e.g. by melt-blowing, melt-spinning, electro-spinning processes and equipment, or by other processes or equipment for producing fibres know to those skilled in the art.

Fibre tow is formed from crimped fibres, for example of cellulose acetate. The crimping of the fibres increases the elasticity of the fibrous bundle therefrom (i.e. the extent to which the fibres can be stretched without breaking). This in turn affects the resilience of the tubes or rods formed therefrom. In a bale of tow, the fibres are highly crimped. Before use the tow may be "bloomed", or treated to reduce the crimping, and to release the fibres from each other. However, the crimp is not entirely eliminated from the fibres. A degree of crimping of the fibres provides elasticity to the tow material, which facilitates the formation of the fibre bundle into the desired shape, such as a rod or a tube.

The method and equipment disclosed herein are exemplified by the production of fibres by melt-blowing. In a typical melt blowing process, fibre-forming polymer is extruded from one or more orifices into convergent streams of hot gas (for example air or possibly an inert gas). The gas streams blow the polymer emerging from the orifices into thin streams of molten polymer, which then solidify to form small diameter fibres of filaments. The fibres are entrained in the stream of gas and may be collected, for example by directing the stream of gas and fibres on to a collection surface. In contrast to tow fibres, meltblown fibres are essentially linear, and uncrimped. A bundle of meltblown fibres therefore has relatively low elasticity and the individual fibres are more prone to breaking. Elasticity in a bundle of meltblown fibres arises primarily from the tangled web structure of the bundle that is created by the accumulation of the fibres into a web, mat or bundle.

Application of heat to the web, for example by heated treatment fluid such as steam or water vapour in air or an inert gas, lubricates the fibres and facilitates disentanglement and formation of a more ordered web of the fibres for formation into a desired linear structure such as a rod or tube.

When the bundle fibres is passed through a die, the application of heat causes the fibre bundle to stretch. The longer the fibres remain in the forming section of the die, the more the fibre bundle stretches. The extent to which the fibre bundle is stretched in the die affects the final density, shape, size and structure of the finished product.

A plasticiser may be used to facilitate the curing of the fibre bundle into a formed shape by bonding together at their points of contact. The plasticiser may be applied to the fibre bundle, for example by spraying. This technique is commonly used on crimped fibre tow. For meltblown fibres, the plasticiser is commonly incorporated in the polymer material from which the fibres are formed and is released therefrom on the application of heat to the fibres sufficient to cause the polymer to soften or to melt.

Embodiments of the die, die assembly, equipment and methods will now be described, by way of example only, with reference to the accompanying drawings, in which:

FIG. 4A is an elevation of the upper part of the forming cone of FIG. 3 from one end;

FIG. 4B is a plan from below of the part shown in FIG. 4A;

FIG. 4C is an elevation of the part shown in FIG. 4A from the opposite end;

Figure 1:
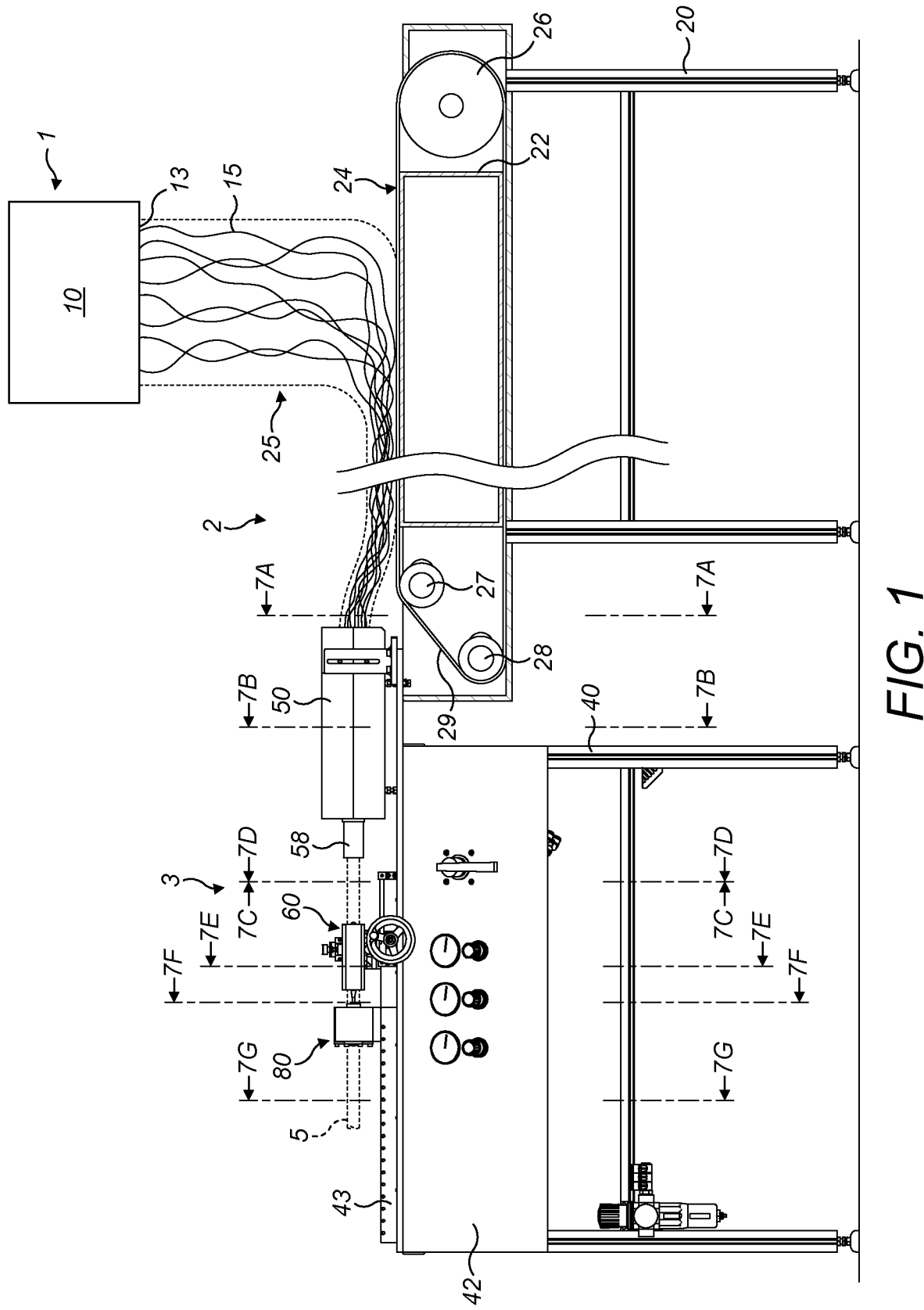
FIG. 1 is a schematic side elevation, partly in vertical cross section, and cut to reduce the width, of an embodiment of equipment for forming a tubular rod of fibrous material.
Figure 5A:
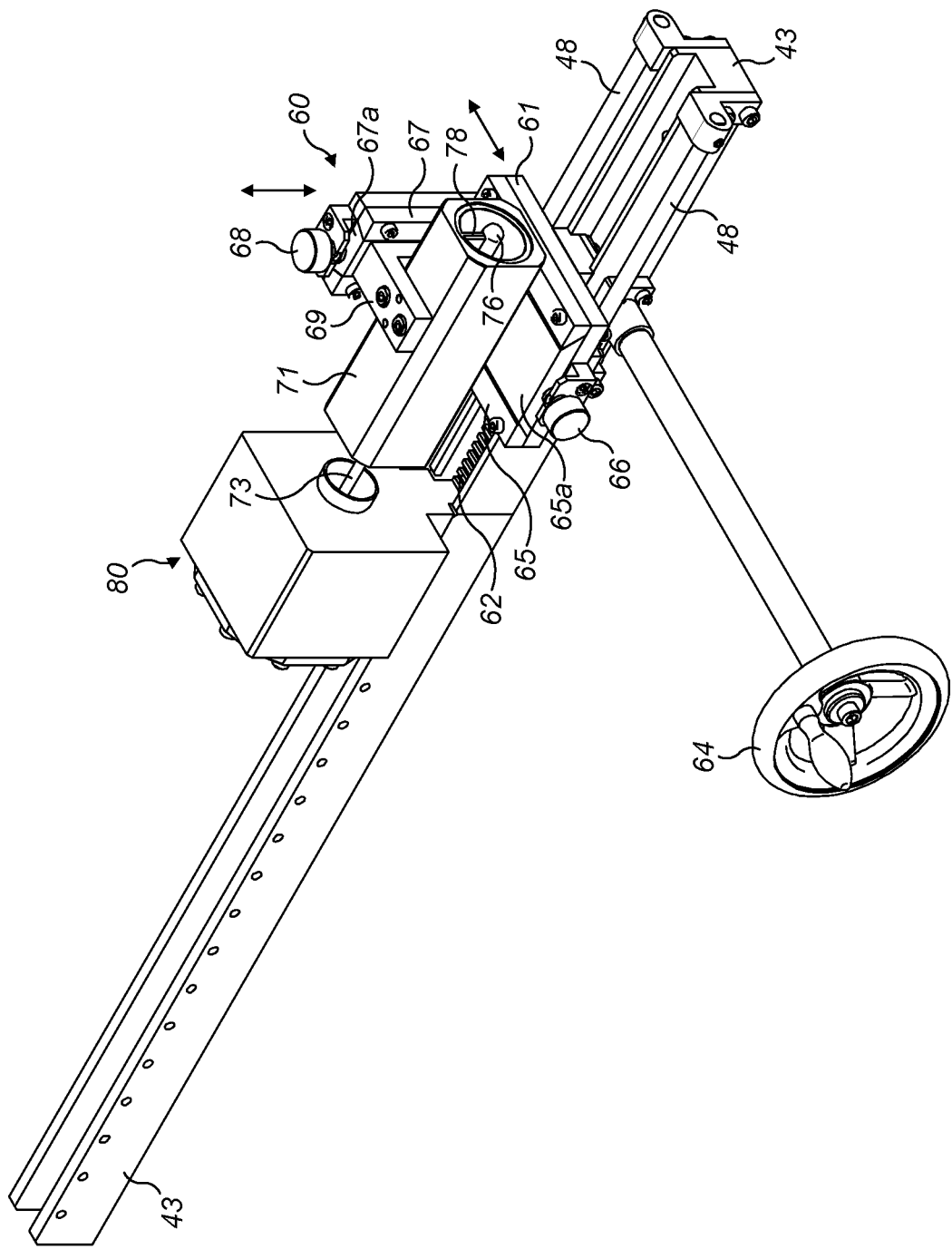
FIG. 5A is a perspective view from above and one end, on an enlarged scale, of embodiments of a mandrel assembly and a die assembly that may be used in the equipment of FIGS. 1 and 2.
Figure 5B:
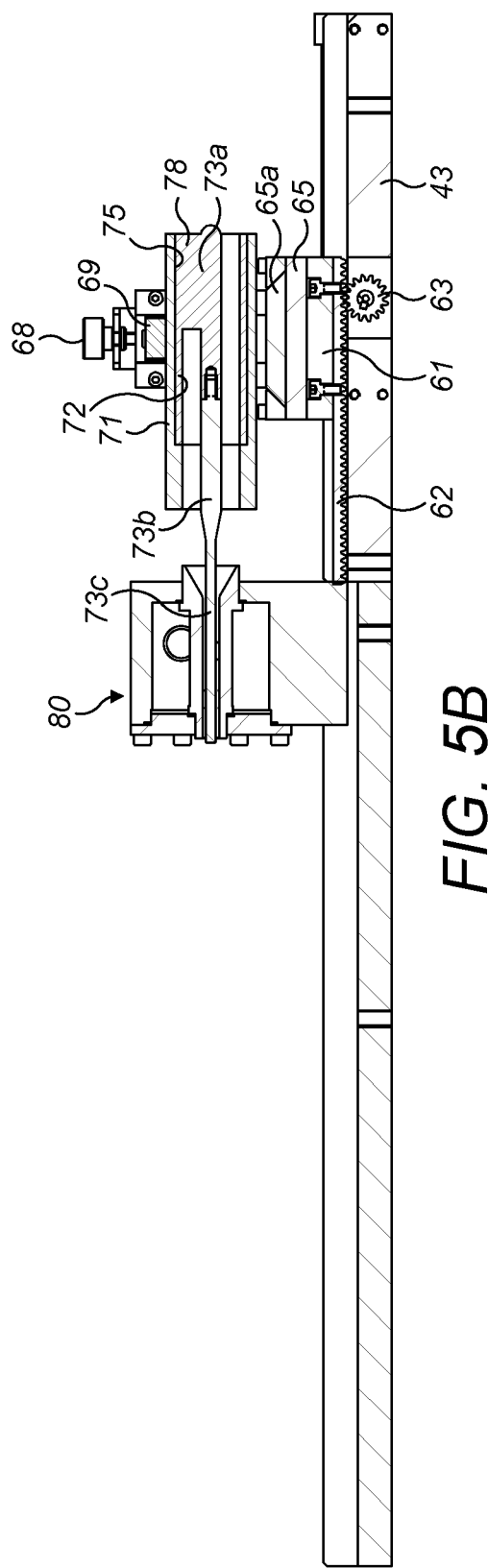
FIG. 5B is a longitudinal, vertical cross-section of the assemblies of FIG. 5A.
Figure 5C:
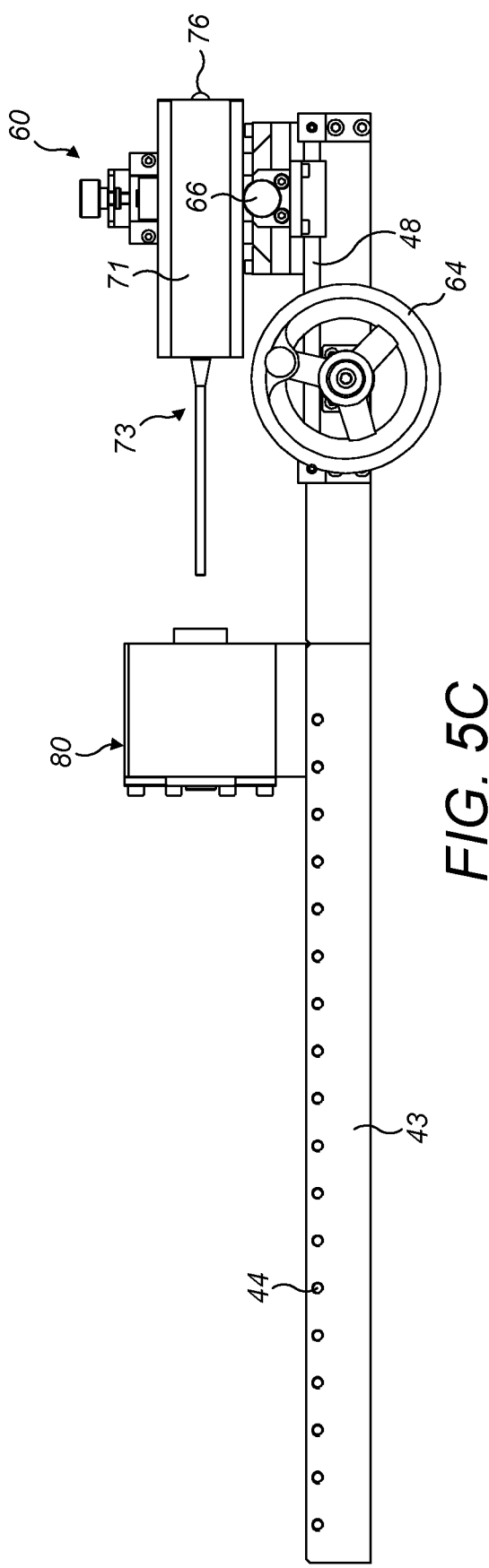
FIG. 5C is a side elevation of the equipment shown in FIGS. 5A and 5B, with the assemblies separated from each other.
Figure 5D:
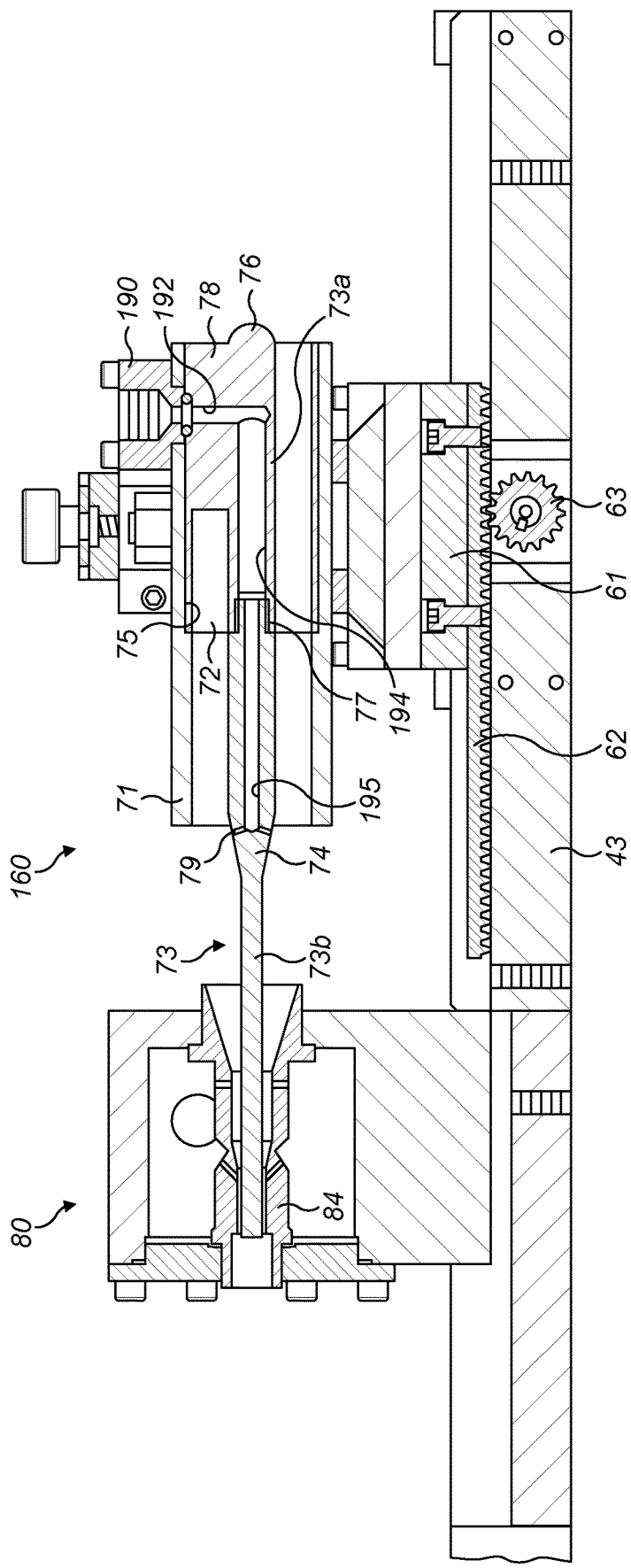
FIG. 5D is a longitudinal cross-section similar to that of FIG. 5B of the equipment of FIG. 1 carrying an alternative embodiment of a mandrel assembly.
Figure 5E:
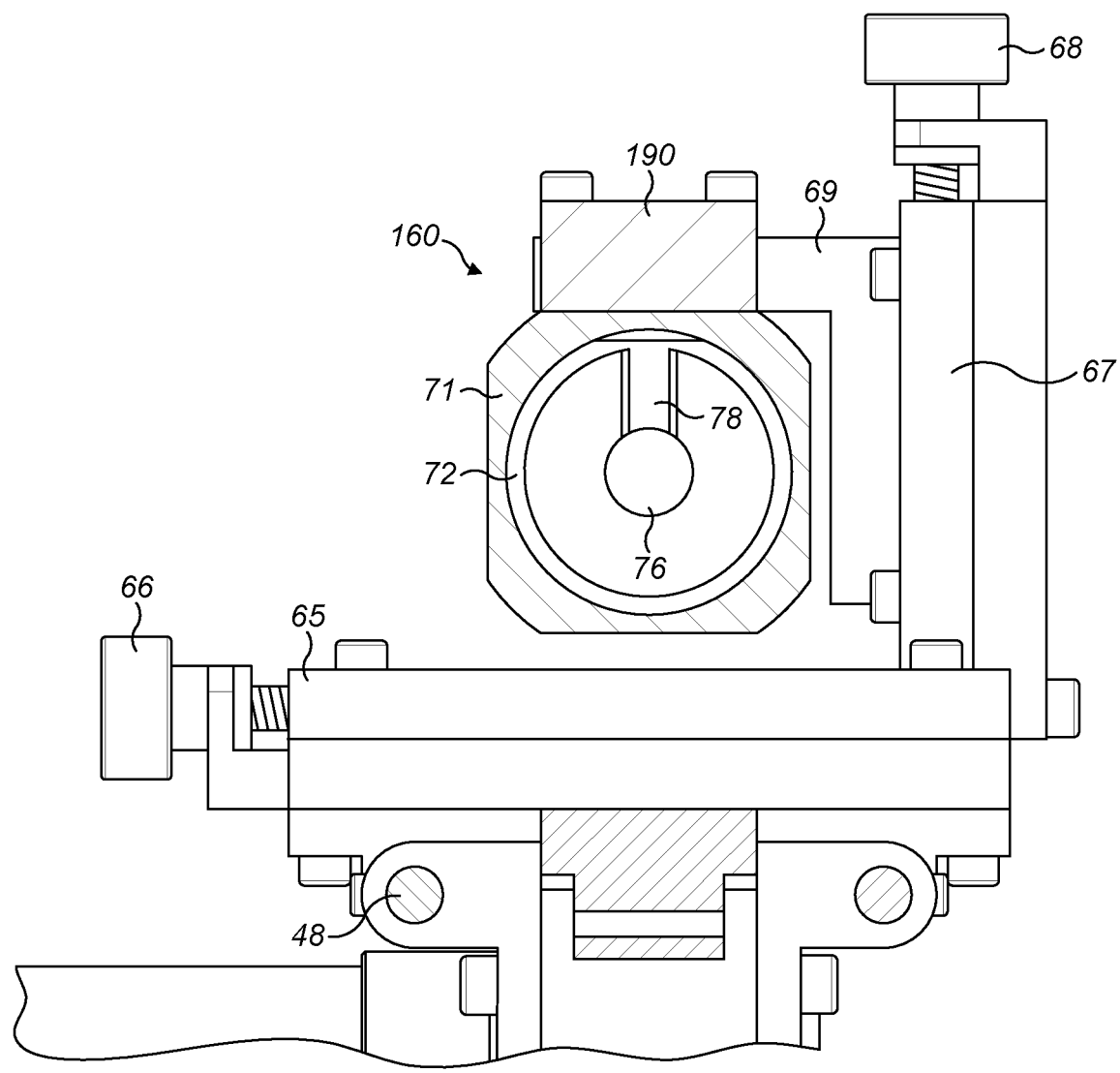
FIG. 5E is an end elevation of the mandrel assembly of FIG. 5D installed on the equipment, viewed from upstream
Figure 6A:
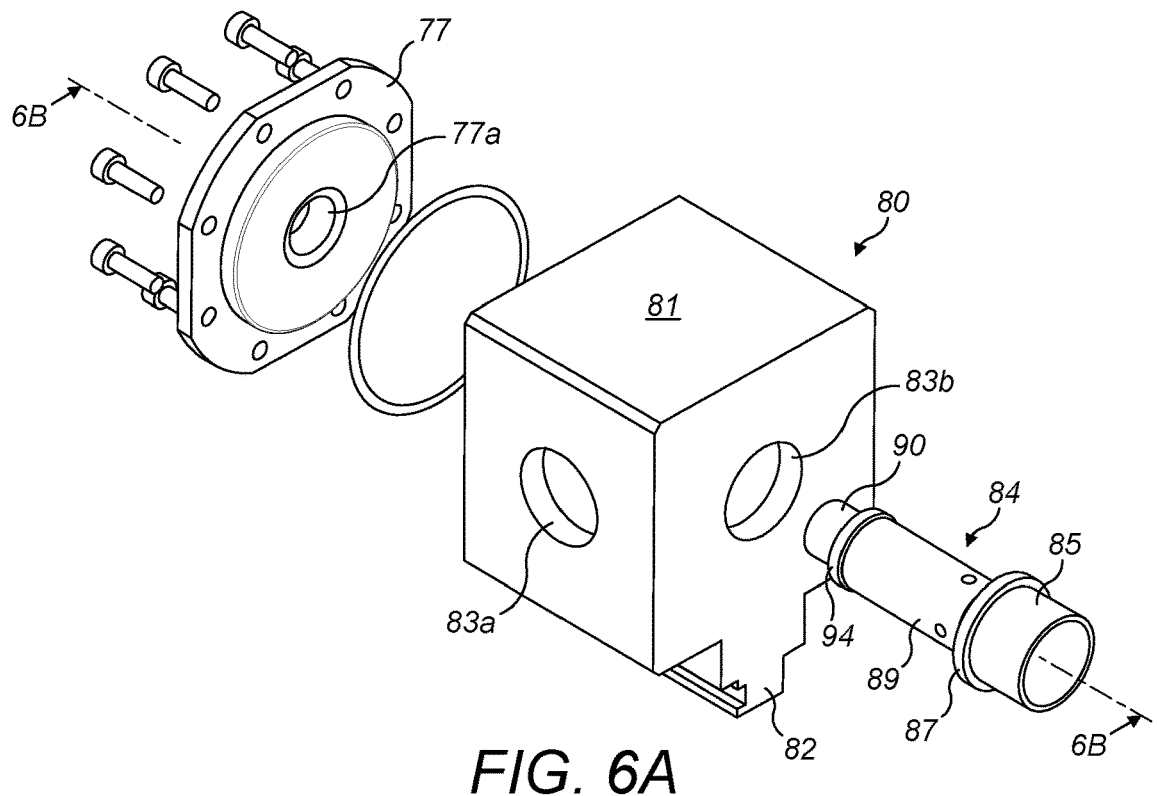
FIG. 6A is an exploded perspective view from above and one end of the die assembly of FIG. 5A, separated from the mandrel assembly.
Figure 6B:
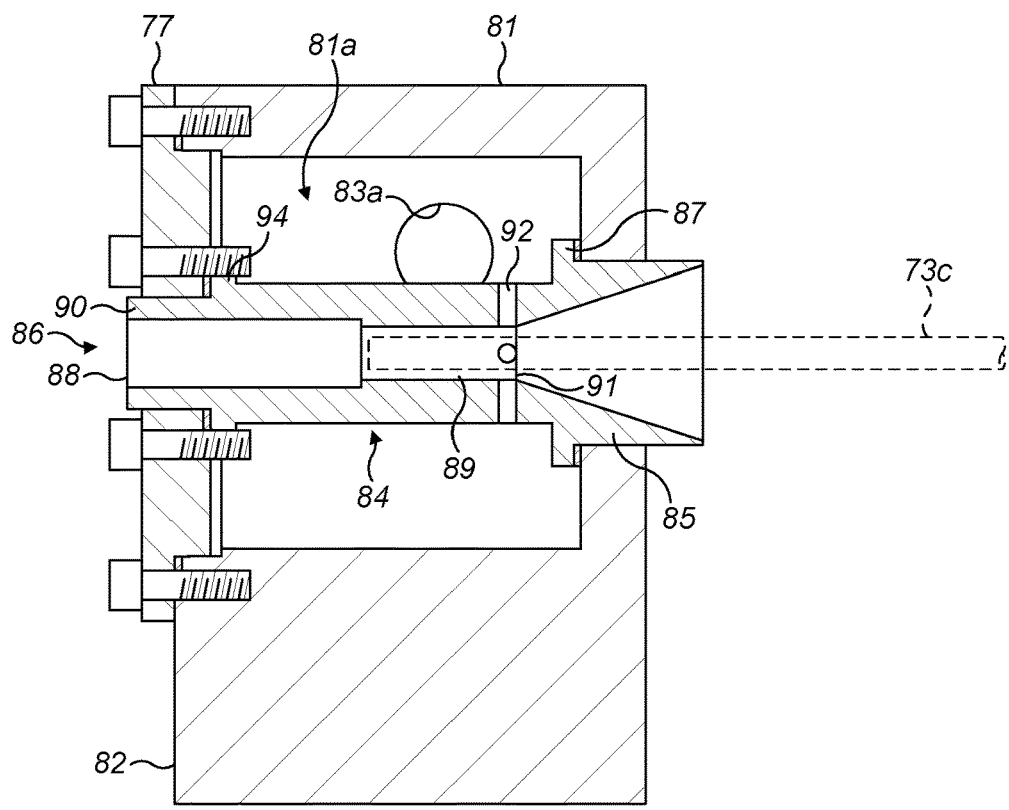
FIG. 6B is a vertical cross section through the die assembly of FIG. 6A in the direction of arrows 6B-6B.
Figure 6C:
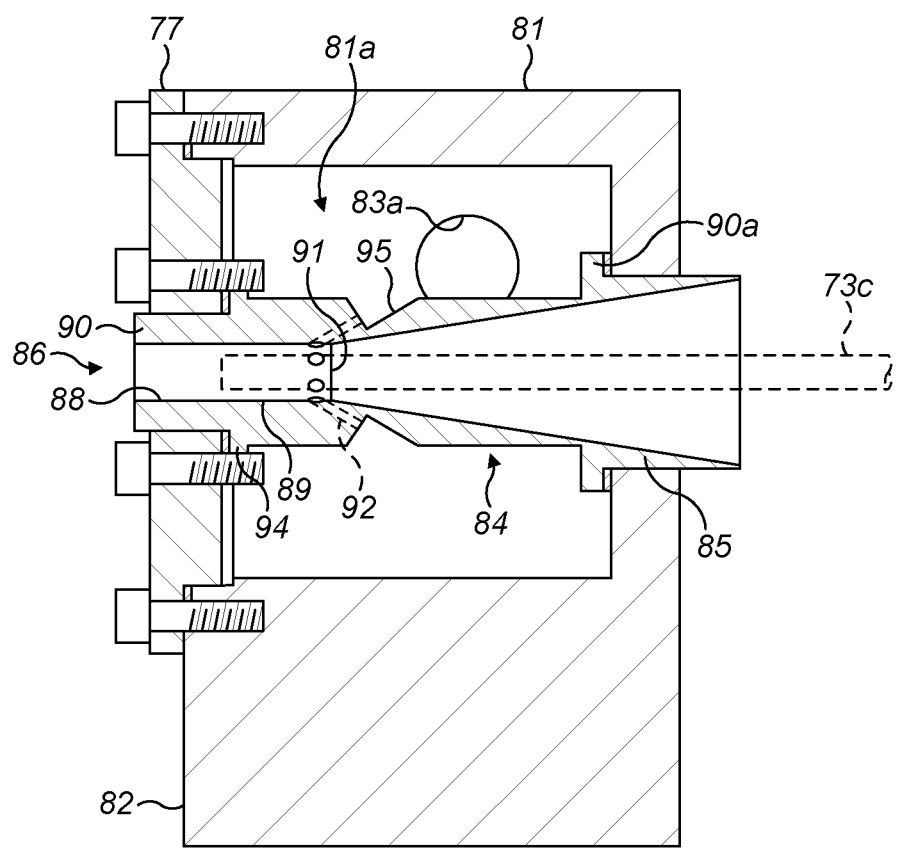
FIGS. 6C, 6D, 6E and 6F are cross sections similar to FIG. 6B of alternative embodiment of die assemblies for use in the equipment of FIG. 1, FIGS. 6D and 6E being shown on a larger scale than that of FIGS. 6B and 6F.
Figure 6D:
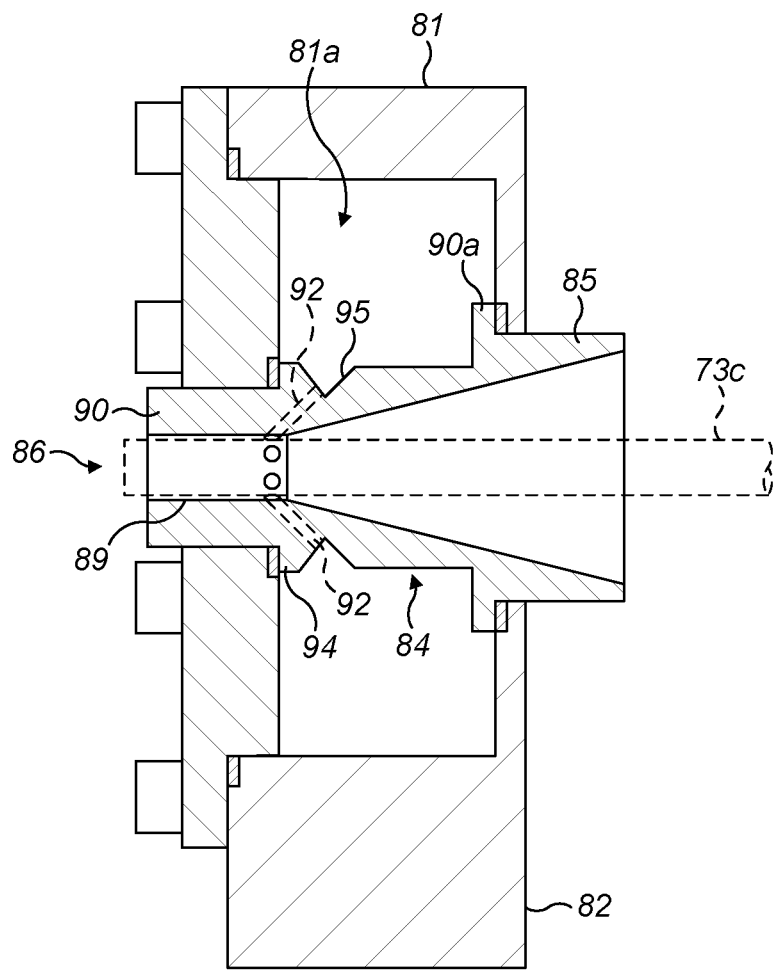
Figure 6E:
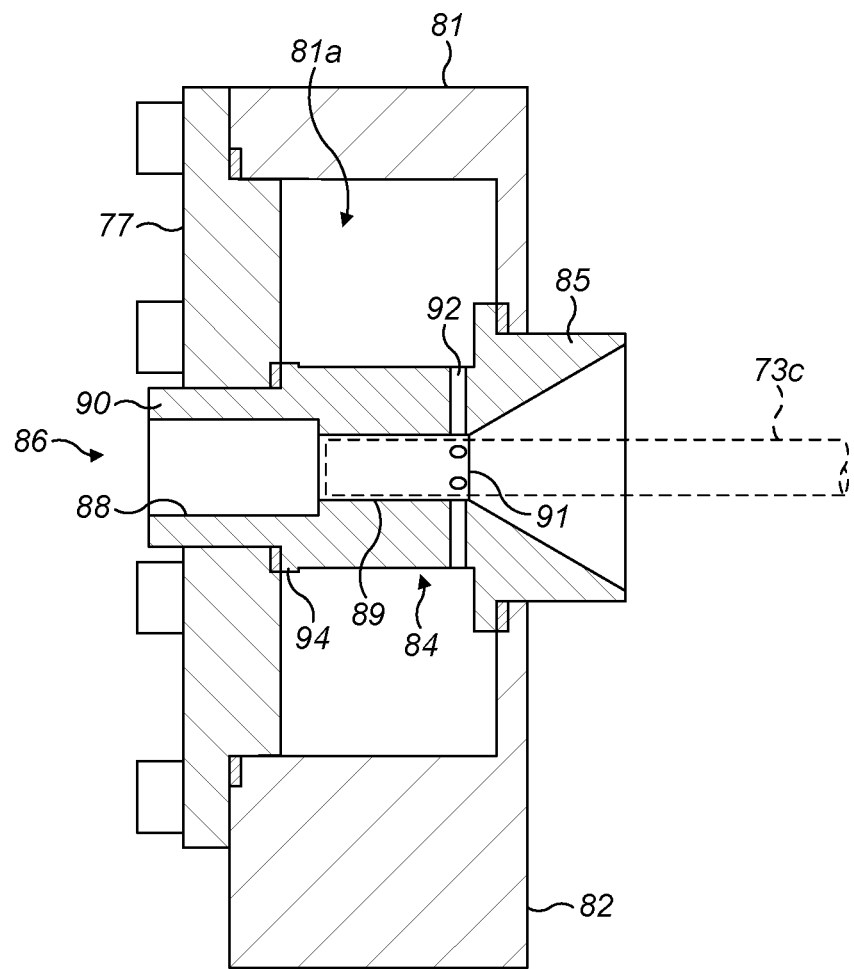
Figure 6F:
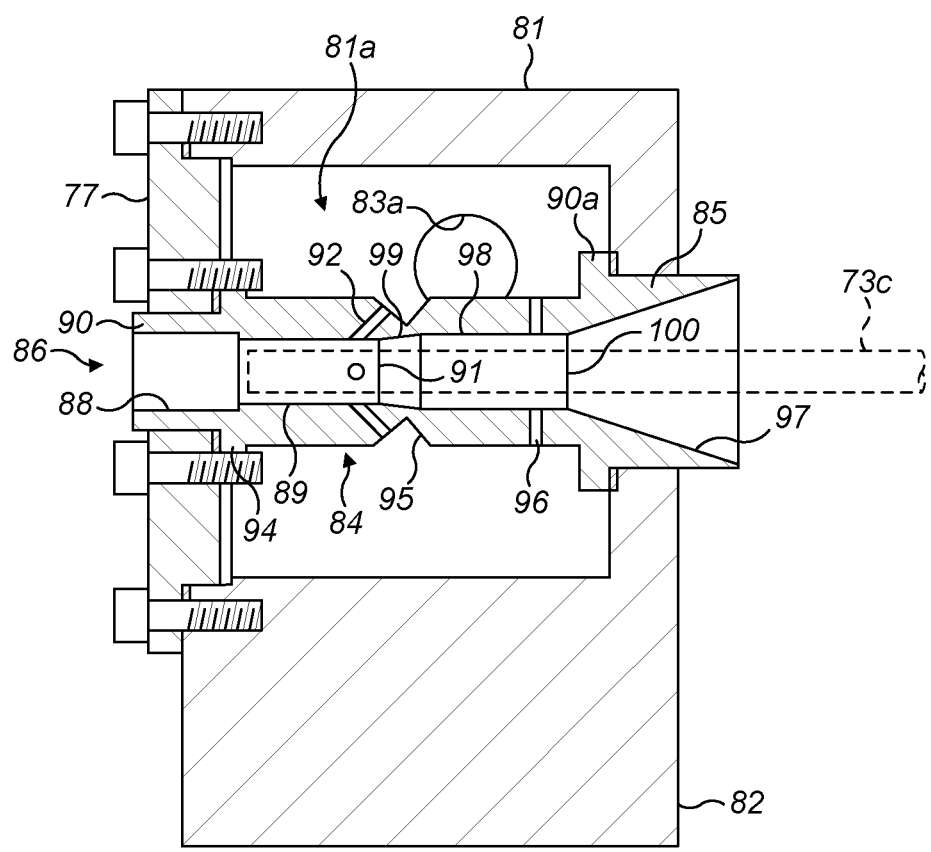
Figure 7A:
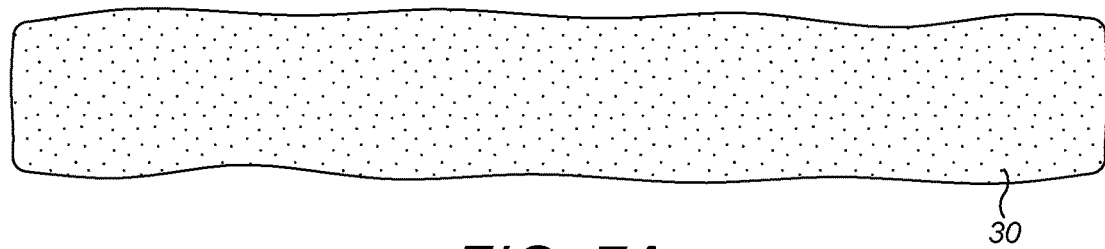
Figure 7B:
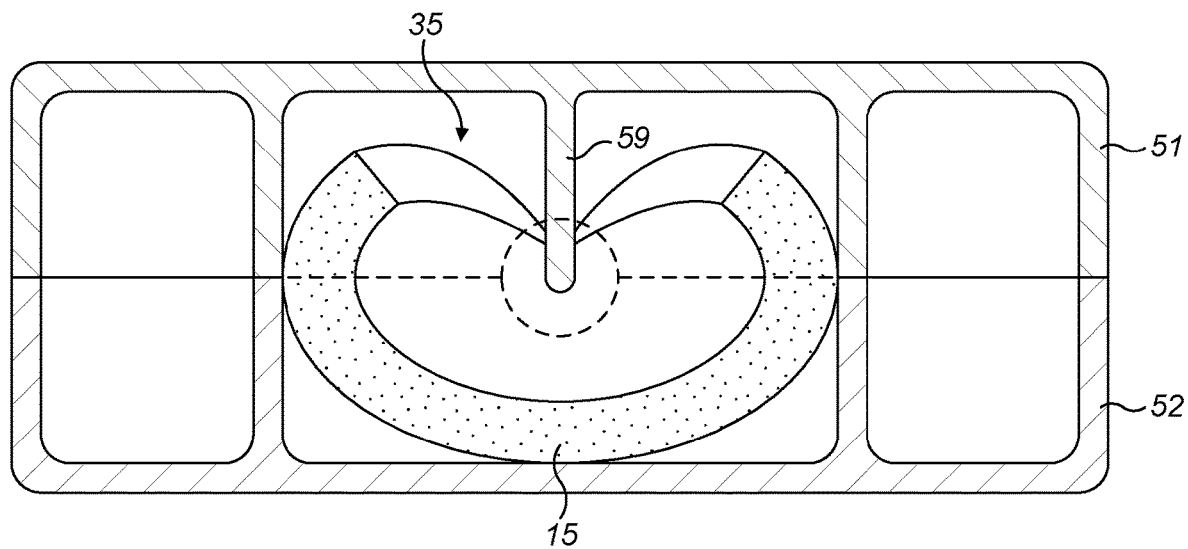

FIGS. 7A, 7B, 7C, 7D, 7E, 7F and 7G illustrate, in cross section, and perspective, the envelope of a bundle of fibrous material as successive stages to as it advances through the equipment of FIGS. 1 to 6B, taken along lines 7A, 7B, 7C, 7D, 7E, 7F and 7G of FIG. 1, in the upstream or downstream directions, as indicated by the arrows, FIGS. 7A and 7B showing the fibre bundle and forming cone to a larger scale than FIGS. 4A to 4C, FIGS. 7C to 7G showing the bundle approximately to the same scale as each other but reduced with respect to FIGS. 7A and 7B.

Figure 2:
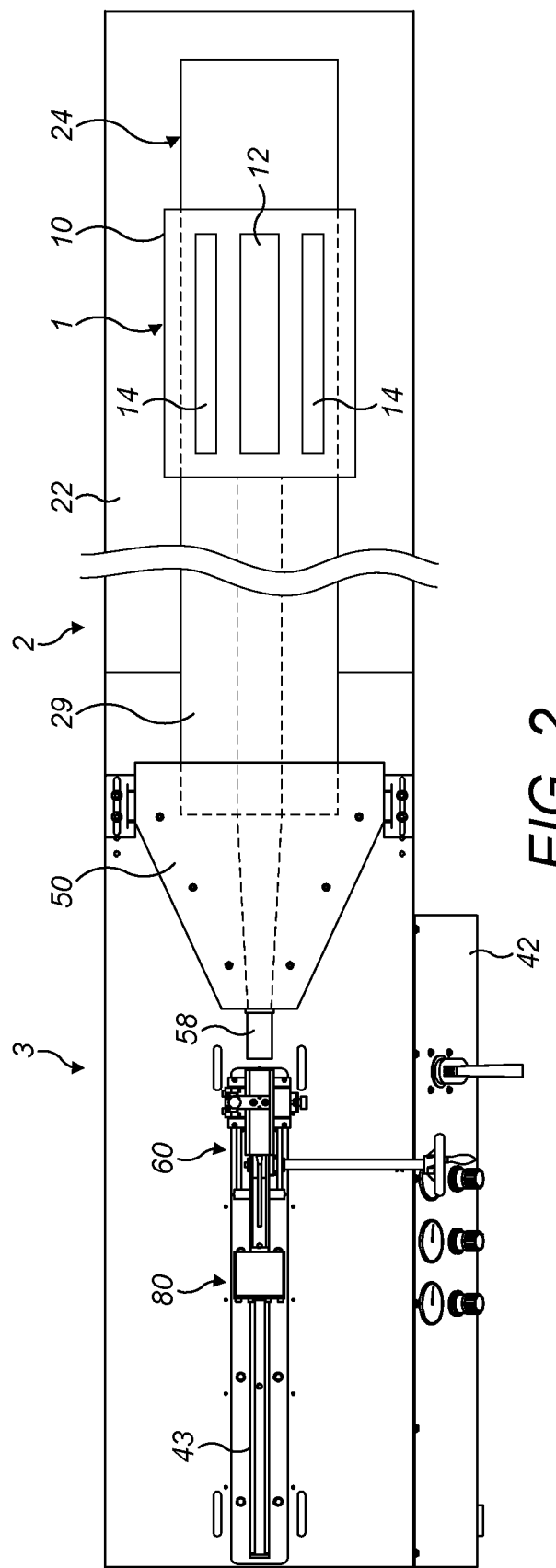
FIG. 2 is a schematic plan of the equipment of FIG. 1.
Figure 3:
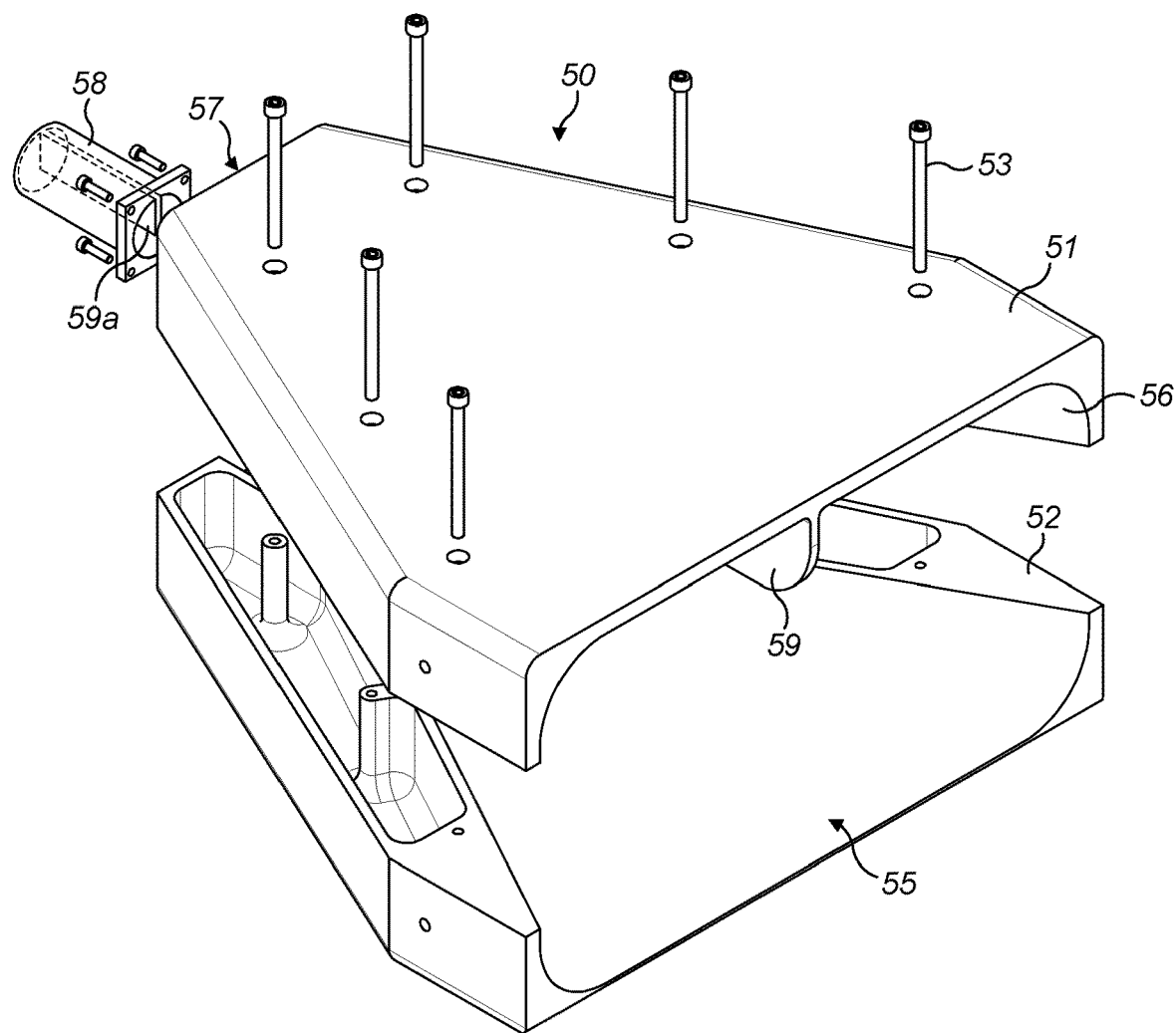
FIG. 3 is an exploded view of an embodiment of a forming cone that may be used in the equipment of FIGS. 1 and 2.
Figure 3A:
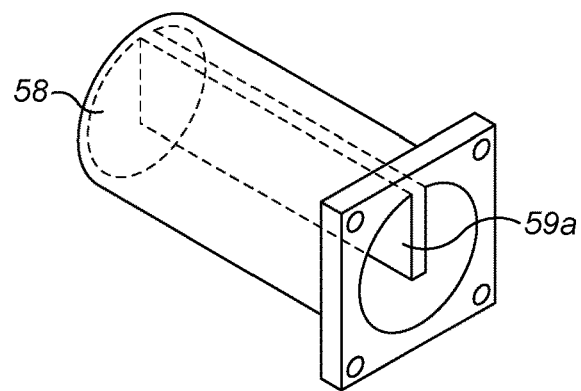
FIG. 3A is a perspective view, on an enlarged scale, of one component of the forming cone of FIG. 3.

Referring to FIGS. 1 and 2, the equipment illustrated is of modular construction and comprises a continuously operable fibre supply module 1, a fibre gathering module 2, in which the fibres are gathered into a bundle in the form of a continuous web, and a forming module 3 in which the bundle of fibres is formed continuously into a rod in the form of a hollow tube 5. In in this example the fibrous tube produced is suitable for use in the manufacture of filters for cigarettes.

Fibre Supply Module

The fibre supply module 1 comprises a melt-blowing head 10, the construction and operation of which will be familiar to persons skilled in the art, and is not illustrated in detail. In other embodiments, the fibre supply module may for example comprise a melt-spinning or an electro-spinning unit, or a feed system for the supply of an expanded web of fibres from a bale of filter tow material.

In the melt-blowing equipment illustrated, molten polymer material is fed into the melt-blowing head 10 through a polymer inlet manifold 12 and emerges from the head at an array of jets 13. Hot pressurised gas, normally air, may be introduced into the melt blowing head 10 through air inlet manifolds 14, 14 on either side of the polymer inlet manifold 12 and emerges from the head in two convergent high velocity gas streams. The streams of hot gas blow the polymer emerging from the array of jets 13 into thin streams of molten polymer, which solidify within a few centimetres of the jets to form a multiplicity of continuous small diameter fibres 15. A complex pattern of entangled fibres entrained within a fast-flowing stream of gas is thereby formed.

Fibre Gathering Module

The fibre gathering module 2 is arranged vertically beneath the melt blowing head 10 to receive the fibres 15 entrained in the air stream from the head. The vertical distance between the melt blowing head and the fibre gathering module is exaggerated in FIG. 1 for clarity.

The gathering module 2 comprises a rigid frame 20 supporting a hollow casing 22 formed from metal plates welded or bolted together and secured to the frame 20. The casing 22 is generally rectangular in plan with its major axis extending horizontally in a longitudinal direction from an upstream end, at the right-hand side of FIG. 1, to a downstream end, to the left in FIG. 1.

A conveyor 24 mounted on the casing 22 provides a transport system for moving fibres 15 from the melt blowing head 10 part of the way along a pathway 25 (the envelope of which is indicated by broken lines in FIG. 1 and partially in FIG. 2) through the fibre gathering module 2 to the rod forming module 3. The conveyor 24 comprises a tensioning roller 26 of relatively large diameter mounted in bearings fixed to the upstream end of the casing 22 for rotation about a horizontal axis that extends transversely of the casing. At the downstream end of the casing 22, an idler roller 27 and a drive roller 28, each of smaller diameter than the tensioning roller, are mounted in bearings fixed to the casing 22 for rotation about horizontal axes parallel to that of the tensioning roller 26, the idler roller 27 being mounted above and upstream of the drive roller 28. An electrical drive motor (not shown) is mounted in the downstream end of the casing 22 to rotate the drive roller 28 about its axis in an anticlockwise direction as seen in FIG. 1.

The three rollers 26, 27, 28 support a conveyor belt 29 of endless construction having an upper run that extends in the longitudinal direction of the casing 24 from the tensioning roller 26 along the upper surface of the casing 22 to the idler roller 27, downwardly and around the drive roller 28, and then back to the tensioning roller 26 in a lower run parallel to the upper run. The idler roller and the tensioning roller may be adjusted in their bearings to align the upper run accurately with the upper surface of the casing 22 and to provide sufficient tension in the conveyor belt.

The conveyor belt 29 is constructed to allow the passage of gas through the belt whilst fibrous material entrained with the gas is deposited and retained on its surface as a web of entangled fibres. For example, the conveyor belt 29, or at least part thereof, particularly the central region extending the length of the belt, may be provided with perforations, slots or apertures, or is otherwise made porous, to allow the passage of gas therethrough whilst supporting fibres 15 on its surface. For this purpose, the conveyor belt may for example be a fabric material woven to a density sufficient to permit a desired flow of gas therethrough under pressure.

The upper surface of the casing 22 is provided with apertures or slots that lie beneath the upper run of the conveyor belt 29, allowing gas to pass through the conveyor belt into the interior of the casing 22, from which air may be evacuated by a vacuum pump (not shown) and discharged away from the equipment. The portions of the upper surface of the casing immediately surrounding the apertures or slots provide support for the upper run of the conveyor belt 29.

Fibre Forming Module

The forming module 3 comprises a rigid frame 40 supporting a number of components of rod-forming equipment for transforming the bundle of fibres 15 into the hollow tube 5, and a control panel 42 therefor. The rod forming equipment comprises a forming cone 50, a mandrel assembly 60 and a die assembly 80. The forming cone 50 is fixed to the frame 40 in alignment with the conveyor 24 of the gathering module 2. The mandrel assembly 60 and the die assembly 80 are adjustably mounted on a rail 43 in the form of an upwardly-open channel, which is secured to the frame 40 in alignment with the linear path of the fibres through the fibre gathering module 2. The longitudinal positions of the mandrel and treatment assemblies 60, 80 along the rail may be adjusted relative to each other and the forming cone as required to match the prevailing operating conditions of the equipment.

Forming Cone

Referring to FIGS. 3, 3A, 4A, 4B and 4C, the forming cone 50 comprises upper and lower half shells 51, 52 each being generally triangular in plan, and having a flat outer surface and a recessed inner surface. The half shells are secured together by bolts 53. The inner surfaces of the half shells together define a smoothly tapering central passage 55 extending from a generally rectangular upstream inlet 56 to a downstream outlet 57, which is in the form of a cylindrical tube of circular cross-section. A tubular outlet extension piece 58 (FIGS. 3 and 3A) is bolted to the half shells 51,52 in axial alignment with the outlet 57.

The inlet 56 is arranged to receive the gathered fibres 15 in the form of a flattened mat or web directly from the conveyor 24 of the fibre gathering module. The tapered central passage is shaped and arranged to compress the fibres and shape the web into a cylindrical shape as the fibres advance through the forming cone towards the outlet 57.

The interior surface of the upper half shell 51 is provided with a divider in the form of a rib 59 that projects radially inwardly towards the axis of the central passage 55 into the path of the fibres through the forming cone, and extends longitudinally between the inlet 56 and the outlet 57. The dividing rib 59 is narrow compared with the diameter of the outlet of the forming cone so that, as the bundle of fibres passes through the forming cone, the divider forms a gap or cleft along the length of the bundle. In order to facilitate the flow of the fibre bundle over the divider, the upstream end 59a of the rib is curved so that the extent to which the rib 59 projects radially towards the axis of the passage increases smoothly and progressively along the rib to a point A positioned inwardly of the inlet 56 at a distance of about 10 to 20% of the overall length of the divider. From this point A and downstream thereof, the rib extends marginally beyond the centre of the passage through the forming cone.

The rib may for example have a radial projection marginally greater than 50% of the diameter of the outlet, for example up to 55%, 60% or 65% of the diameter of the outlet, depending upon the desired internal diameter of the finished tube formed from the fibres.

The outlet extension piece 58 is also formed with an axial internal rib 59a that has the same radial length and lies in the same plane as the rib 59 within the upper half shell, thereby forming a continuation of the divider 59 in the upper half shell 51.

Mandrel Assembly

Referring to FIGS. 5A, 5B and 5C, the mandrel assembly 60 comprises a carriage 61 that is mounted for sliding movement along the upstream part of the rail 43 and supported by parallel guides 48, 48 attached to each side of the rail 43. The carriage includes a rack 62, which is received within the channel formed by the rail 43 and engages with a pinion wheel 63 mounted on the rail 43 for rotation about a transverse axis by a hand-wheel 64, enabling the mandrel assembly to be moved longitudinally back and forth along the rail 43 into a desired position in relation to the die assembly 80 and the forming cone 50.

The carriage 61 also includes a horizontal guide 65 for a first slide block 65a that is mounted in the guide for transverse movement relative to the carriage 61. The transverse position of the first slide block within the horizontal guide may be adjusted and fixed by means of a locking bolt 66. The first slide block 65a supports a vertical guide 67 for a second slide block 67a that is mounted therein for vertical movement relative to the carriage 61. The vertical position of the second slide block 67a within the vertical guide 67 may be adjusted and fixed by means of a locking bolt 68. The second slide block 67a carries a bracket 69 which in turn supports an axially-oriented, tubular casing 71 which is open at each end. The casing houses a mandrel, indicated generally at 73, in the form of an elongated rod that extends along the central axis of the casing 71. The longitudinal, vertical and horizontal position of the mandrel may therefore be set precisely relative to the forming cone and the die assembly 80 by movement of the carriage longitudinally along the track, and by adjustment of the first and second slide blocks 65a and 65b.

The tubular casing 71 for the mandrel 73 is generally square in external cross-section, with bevelled edges along its length, and generally cylindrical in internal cross-section, with a counterbore 75 in the upstream end of larger internal diameter than the downstream end of the casing. The casing 71 is secured to the bracket 69 by two bolts, and is aligned in the longitudinal direction, i.e. with its central axis arranged in the direction of travel of the bundle of fibres through the equipment.

A tubular mandrel support 72 is mounted within the counterbore 75 of the casing 71. The mandrel support has an external diameter conforming to the internal diameter of the counterbore 75 and is provided internally with a bracket or carrier for the mandrel 73. In this embodiment, the bracket is in the form of a divider plate 78 that projects radially inwardly from the internal surface of the mandrel support 72 and extends axially within the support from the upstream end thereof. The rotational position of the mandrel support 72 within the casing 71 is adjusted such that the plate 78 lies in a desired radial orientation, in this case vertical. The radial extremity of the divider plate 78 is connected to the mandrel 73 and may for example be formed integrally therewith as a moulding.

The mandrel 73 comprises an elongated cylindrical rod which, for ease of assembly is made in two parts arranged coaxially, an upper mandrel rod 73a and a lower mandrel rod 73b. The upper rod 73a is of uniform radial cross section with a diameter greater than the thickness of the divider plate to which it is connected, and is positioned by the plate along the central axis of the mandrel support 72 to project downstream into the support 72. The upstream end of the upper mandrel rod terminates in a domed portion or boss 76 that projects upstream, beyond the mandrel support into the path of travel of the bundle of fibres. The downstream end of the upper mandrel rod 73a is provided with an internally-threaded aperture, which extends parallel to the central axis of the rod.

The lower mandrel rod 72b has a cylindrical segment at its upstream end that corresponds in diameter to the upper mandrel rod 73a and, at its downstream end, a cylindrical segment 73c of reduced diameter, which corresponds to the desired internal diameter of the finished tubular filter rod 5. The two cylindrical segments of the lower mandrel rod are connected smoothly to each other by a tapered intermediate segment, as illustrated in FIGS. 5B and 5C. The upstream end of the lower mandrel rod 73b carries a threaded axial bolt, which is received in the aperture in the downstream end of the upper mandrel rod 73a, thereby fixing the two parts of the mandrel in coaxial alignment within the mandrel support 72 and the casing 71. The lower mandrel rod 73b may be removed and replaced by a similar component having a downstream end of a different diameter, according to the desired dimensions of the finished tubular rod 5.

The mandrel assembly 60 is arranged and configured to receive the bundle of fibres emerging from the outlet of the forming cone 50. The divider plate 78 of the mandrel support 72 is aligned radially with the divider ribs 59, 59a in the forming cone 50 and outlet extension piece 58 so that, as the bundle of fibres passes through the casing, the divider plate 78 maintains the formation of the cleft along the length of the bundle, as the domed portion 76 on the upstream extremity of the mandrel 73 plate becomes inserted into the cleft at the centre of the bundle of fibres. The divider plate 78 therefore serves the dual function of a bracket that carries the mandrel, and a divider for keeping open the cleft in the fibres formed upstream thereof. Downstream of the divider, the cleft in the bundle of fibre closes and the bundle of fibres adopts a continuous tubular configuration around the mandrel.

Alternative Mandrel Assembly

An alternative mandrel assembly 160 for use in the equipment is described below, with reference to FIGS. 5D and 5E. The mandrel assembly 160 is of similar construction to that described with reference to FIGS. 5A, 5B and 5C, and in the drawings like parts are indicated by the same reference numerals.

In the mandrel assembly 160 of FIGS. 5D and 5E, the mandrel 73 is modified to enable a gaseous or liquid treatment fluid, e.g. steam or water vapour, to be delivered to the fibre bundle as the bundle passed over the mandrel. To this end, the upstream end of the casing 71 is provided on its upper surface with an inlet for a steam line (not shown). The inlet comprises a gas tight connection 190 having a central passage that communicates with a radial bore 192 in the divider plate 78. The bore 192 extends radially downwardly to the centre line of the mandrel, where the bore communicates with a central axial passage 194 in the upper mandrel rod 73a. The axial passage 194 extends to the threaded aperture in the downstream end of the upper mandrel rod 73a. The lower mandrel rod 73b is likewise provided with a central axial passage 195, which is aligned with the passage 194 in the upper mandrel rod 73a. The axial passage 195 extends in the axial direction through the threaded bolt 77 on the upstream end of the lower rod and terminates at the centre of the tapered intermediate segment 74 of the mandrel. The intermediate segment 74 is provided with four outlet vents 79 that connect the central bore in the mandrel to the external surface of the mandrel in order to discharge the treatment fluid into the fibre supported on the mandrel 73. The vents are disposed at equiangular intervals (90°) around the axis of the mandrel and are inclined in the downstream direction at an angle of 20-70° to the central axis of the mandrel in the direction of movement of the fibre bundle over the mandrel.

In this embodiment, steam or other treatment fluid may be fed into the mandrel 73 through the connector 190. The steam may then pass to the vents 79, where it contacts the fibre bundle as it is advanced through the equipment and passes over the surface of the mandrel. Treatment of the fibres with steam at this stage increases the flexibility and pliability of the fibres, thereby pre-conditioning the fibres for further treatment in the treatment unit 80.

Die Assembly

The die assembly 80, positioned downstream of the mandrel assembly 60 is in the form of a steam block, illustrated in more detail in FIGS. 6A and 6B. The die assembly includes a die 84, in which the fibre bundle is formed into its final configuration, and structural components for heating the die and for treating the fibres with steam to cure the shaped fibre bundle.

The die is mounted in a hollow cuboidal housing 81 defining an internal steam chamber 81a. The housing 81 is provided with a mounting bracket 82 by which the assembly may be mounted for sliding movement back and forth along the downstream part of the rail 43. The housing may be locked in any one of several discrete locations along the rail defined by a row of bolt holes 44. A locking pin on the mounting bracket 82 can engage with the bolt holes to secure the die assembly in a selected position on the rail 43.

The lateral faces of the housing 81 are each provided with an aperture 83a for receiving steam connectors (not shown) through which steam may be introduced into the housing. The downstream face of the assembly is provided with a removable closure plate 77 which may be may be bolted into an aperture in the housing and sealed thereto by washers. The closure plate 77 and the upstream face of the housing are provided with opposed apertures 77a, 83b by means of which a die 84 may be mounted in the housing and sealed thereto by washers.

The die 84 is a tubular body, with a central axial passage therethrough, indicted generally at 86. The central passage through the body of the die has an inlet section 85 in the form of a socket which is provided with a sealing collar 87 on its external surface. The inlet section 85 communicates at its downstream end with a forming section 89 in the centre of the passage 86, the junction between the inlet section 85 and the forming section 89 providing the entrance 91 to the forming section. The forming section has an internal circumferential profile corresponding to the desired external profile (circular in this embodiment) of the rod into which the fibre bundle is formed.

In this embodiment, the inlet section extends over about one third, e.g. 30-35%, of the overall length of the central passage (33% in the embodiment as illustrated). The internal surface of the inlet section 85 is conical and tapers in the downstream direction from a diameter equal to or smaller than the downstream outlet from the mandrel support 72, (e.g. 70%, 60%, 50%, or 40% smaller) to a diameter equal to the desired external diameter of the finished tubular filter rods. In order to facilitate the gathering of the bundle of fibres as it approach the constriction provided by the entrance 91 to the forming section, and to reduce the possibly of the fibres blocking the entrance, the conical surface tapers at a relatively small angle to the central axis of the die, for example an angle of 9-27 degrees, e.g. 12-20 degrees, in this embodiment about 18°, to the central axis of the die.

The forming section 89 is of a uniform circular internal cross-sectional profile along its axial length, and is shaped to form the fibres 15 into a configuration having the desired external circumferential profile of the finished tube as the fibres pass therethrough. The forming section extends over about one quarter, e.g. 20-30% of the length of the central passage (26% in this case).

The downstream end of the forming section communicates with an outlet section 88 of the central passage 86, which is also of a uniform circular cross-sectional profile along its length, but of a diameter larger than that of the forming section, defining an internal circumferential profile larger than that of the desired external profile of the finished rod. The outlet section forms the remaining section of the central passage, e.g. 35-50% of the overall length of the central passage (41% in this case). The external surface of the outlet section 88 of the die is in the form of a spigot 90 surrounded by a sealing collar 94.

The die 84 can be installed in the housing 81 so that the spigot 90 at the downstream end of the die is received in the aperture 83b in the closure plate 77 in the downstream face of the housing 81 with a sealing washer between the plate 77 and the sealing collar 94 on the spigot. The socket 85 at the upstream end of the die is received in the aperture 83b in the upstream face of the housing with a further sealing O-ring between the housing and the sealing collar 87 on the socket.

When the equipment is in use, the downstream end of the mandrel rod 73c (indicated in broken lines in FIG. 6B) is inserted into the central passage 86 so that the mandrel extends through the whole, or substantially the whole, length of the forming section, or marginally beyond. The tip of the mandrel 73 lies at or near the junction between the forming section 89 and upstream end of the outlet section 88, in this case immediately upstream thereof. The forming section 89 and the mandrel 73 cooperate to define an annular constriction between the mandrel 73 and the cylindrical wall of the passage equal to the desired annular thickness of the tube of fibres.

The cylindrical wall of the die 84 is provided with four conduits 92, in this case 2 mm in diameter, which extend through the body of the die from the external surface of the die to the central axial passage 86, thereby placing the central passage in communication with the steam chamber 81a. The conduits extend towards the axis of the die in a common radial plane at right angles to the axis of the die, and are arranged at equally spaced intervals of 90° so that two of the conduits are vertical and two are horizontal. The common radial plane of the conduits lies immediately downstream of the junction 91 between the inlet section and the forming section, so that the outlets of the conduits can discharge steam from the steam chamber 81 into the central passage 86 of the die in the immediate vicinity of the entrance 91 to the forming section 89. In this embodiment, the outlets lie immediately downstream of the entrance 91, at a distance of about 5% or less of the length of the forming section from the entrance. The centres of the outlets lie on a common circle downstream of the entrance and are spaced axially from the plane of the entrance 91 by a distance of about half (0.5 times or 50% of) the diameter of the conduits.

In use, superheated steam may be passed from a supply line into the steam chamber in the housing 81 via the apertures 83, by way of a valve (not shown) controlled from the control panel 42. The heat from the steam is transferred to the fibres in the die and heats the fibres to a curing temperature, at which the fibres fuse together at their points of contact, thereby fixing the bundle of fibres in a tubular configuration.

The heat is transferred by conduction through the body of the die to the central passage to the fibres therein which are in contact with the internal walls of the passage. In this embodiment, heat is transferred by conduction predominantly to the forming section, which lies wholly within the steam chamber 81a. The inlet section 85 will be cooler than the forming section because a portion of the socket 85 lies within the walls of the housing 81, out of direct contact with steam within the steam chamber. Similarly, the region of the outlet section downstream of the sealing collar 94 will be cooler than the region upstream thereof because it lies within the closure plate 77, out of direct contact with the steam in the chamber 81a.

In addition, heat is transferred to the central passage in the die by steam which passes through the conduits 92 and into contact with the fibres supported on the downstream end of the mandrel 75.

As the bundle passes into the forming section the rate of compression of the fibres is at its greatest at the entrance 91 to the forming section 89, and the density of fibres in the bundle is increased to its greatest. Accordingly, the resistance to the passage of the fibres through the die is at its maximum in this region. By arranging the outlets of the conduits 92 in or near the same radial plane as the entrance to the forming section, the steam has the effect not only of curing the fibre bundle, but also of plasticising the fibres, lubricating the passage thereof through the entrance of the forming section, and reducing drag on the fibres, thereby facilitating the formation of the fibres in a tubular structure around the mandrel, and reducing the risk of the entrance becoming blocked by fibre. Since the four conduits 92 are at 90° to the direction of movement of the bundle of fibres through the die, the jets of steam emerging from the conduits apply substantially the same forces to the fibres in both the upstream and downstream directions and do not therefore significantly oppose the movement of bundle of fibres as it moves through the die.

The outlet section 88 has a larger cross-sectional area than the forming section as a result of which the cured fibre rod emerging from the forming section is predominantly out of contact with the internal walls of the central passage 86 as it passes through the outlet section. This enables the rod to cool more quickly in the outlet section.

The fibre bundle is drawn through the equipment by take-off rollers (not shown) of conventional construction positioned downs stream of the treatment unit. The movement of the fibres through the equipment may also be assisted by means of a stuffer jet (not illustrated), locate for example between the forming cone 50 and the mandrel assembly 60.

Alternative Dies and Die Assemblies

Further embodiments of die assemblies are illustrated in FIGS. 6C, 6D, 6E and 6F. The embodiments illustrated in FIGS. 6C to 6D are of similar construction to that illustrated in FIG. 6B, and the same reference numerals are used to identify like features of the die assemblies. For the sake of brevity description of the common features of the embodiments will not be repeated.

Referring to the embodiment illustrated in FIG. 6C, the inlet section 85 of the die 84 is of greater axial length than the corresponding inlet section of the embodiment illustrated in FIG. 6B and, from the upstream end of the socket 85 to the entrance 91 to the forming section 89, extends over about 70%, e.g. 65-75%, of the overall length of the central passage (67% in this case). The conical internal surface of the inlet section 85 tapers in the downstream direction at a smaller angle to the central axis of the die than the embodiment of FIG. 6B, for example an angle of 4-15 degrees, e.g. 8-12 degrees, in this embodiment 9°, to the central axis of the die.

The forming section 89 is of a uniform circular internal cross sectional profile along its axial length extends over about 25%, e.g. 20-30%, of the length of the central passage, from the junction of the forming section with the inlet section 85 to the axial position of the sealing collar 94 on the spigot 90 (24% in this case).

The outlet section 88 of the central passage 86 forms the internal surface of the spigot 90 at the downstream end of the die and, in this embodiment, is of the same circular cross-sectional profile along its length as the forming section 89. The outlet section forms the remaining section of the central passage, about 15%, e.g. 5-15% of the overall length (9% in this case).

In this embodiment, heat is transferred to the central passage primarily by conduction predominantly to the inlet section, which is longer than the forming section and has a greater part of its external surface area within the steam chamber 81. The external surface of the forming section lies wholly within the steam chamber and also conducts a significant proportion of the heat to the central passage. However, being shorter than the part of the inlet section that lies within the chamber, it transfers proportionally less heat to the central passage than the inlet section. The outlet section will transfer the least proportion of the heat to the central passage, and will be coolest, because its external surface is not in direct contact with the steam in the chamber 81a, and lies almost wholly within the closure plate 77.

A V-shaped groove 95 is formed circumferentially in the external wall of the die 84 with its deepest circumference aligned upstream of the entrance to the forming section of the passage, at the junction with the inlet section. Six conduits 92, in this case 2 mm in diameter, are formed in the body of the die and extend from the downstream face of the groove and through the wall of the central axial passage 86, thereby placing the steam chamber 81a in communication with the central passage of the die. The conduits 92 extend in straight lines and converge in the downstream direction towards the axis of the die, at an angle of less than 90° to the axis of the passage, in this case about 30° to the axis of the die. The conduits are arranged at equally spaced intervals of 60° degrees around the axis. The outlets of the conduits lie on a common circle transverse to the axis of the passage, immediately downstream of the junction between the inlet section and forming section, so as to discharge fluid from the steam chamber 81a into the central passage 86 of the die the immediate vicinity of the entrance 91 to the forming section 89. In this embodiment, the conduits discharge into the forming section at a distance from the entrance of about 15% of the length of the forming section. The common circle on which the centres of the outlets lie is spaced axially from the plane of the entrance by a distance of about 1.5 times (about 150%) of the diameter of the conduits.

When the equipment is in use, the downstream segment 73c of the mandrel 73 is inserted into the central passage 86 to define an annular gap between the mandrel 73 and the cylindrical wall of the passage equal to the desired annular thickness of the tube of fibres. The tip of the mandrel rod lies at or near the radial plane of the sealing collar of the spigot 90, by the internal face of the closure plate 77. This is the region at which the temperature within the outlet passage begins to fall below that of the forming section, at which point the curing of the fibre bundle is substantially complete.

In use, superheated steam may be passed from a supply line into the housing 81 via the apertures 83, as described with reference to the embodiment illustrated in FIG. 6B. The steam passes through the conduits 92 into the forming section of the die so as to cure the bundle into a tubular configuration. The relatively long inlet section allows more time for the fibres to form around the mandrel, and can result in a more uniform tubular structure. The increased length of the inlet section, and its elongated conical surface may also improve heat transfer through the walls of the die. The arrangement of the outlets of the conduits 92 in the immediate vicinity of the entrance to the forming section enables the steam not only to cure the fibre bundle, but also to plasticise the fibres, to lubricate the passage thereof through the entrance of the forming section, and to reduce drag on the fibres, thereby reducing the risk of the entrance becoming blocked by fibre. Since the six conduits 92 are at 30° to the direction of movement of the bundle of fibres through the die, the jets of steam emerging from the conduits apply forces to the fibres in the downstream direction and none in the upstream direction, and do not oppose the movement of bundle of fibres as it moves through the die. The application of the compressive force to the fibres in the downstream direction improves the elasticity of the finished rod, particularly when the fibres are produced by a melt blowing process.

Referring to the embodiment illustrated in FIG. 6D, the overall constructions of the housing 81 and the die 84 are similar to those of the embodiment illustrated in FIG. 6C, except that the internal length of the steam chamber in the upstream to downstream direction is reduced to about 40% of that of the embodiment of FIG. 6C, and the length of the die is reduced to about 60% of that illustrated in FIG. 6C.

The inlet section 85 of the die is of about the same proportion of the axial length as the corresponding inlet section of the embodiment illustrated in FIG. 6C and extends over about 70%, e.g. 65-75%, of the overall length of the die. The inlet section extends across substantially the whole length of the steam chamber and, having the greater part of its external surface area within the steam chamber 81*a*, is primarily responsible for the conductive transfer of heat to the fibre rod as it advances through the die to the entrance 91 to the forming section at the junction of the inlet section and the forming section. The conical internal surface of the inlet section 85 tapers in the downstream direction at a larger angle to the central axis of the die in the embodiment of FIG. 6C, for example an angle of from 7 to 21 degrees, e.g. 10-18 degrees, in this embodiment 14°, to the axis of the central passage of the die.

The forming section 89 extends over the remainder of the length of the central passage and lies wholly within the spigot 90 of the die, which itself lies within the closure plate 77 of the housing. The entrance to the forming section, at the junction thereof with the inlet section, lies in the same plane as the inner wall of the steam chamber. The walls of the die surrounding the forming section are not therefore directly in contact with the steam chamber 81. The forming section is therefore cooler that in assemblies described with reference to FIGS. 6B and 6D The forming section 89 is of uniform circular internal cross-sectional profile along its axial length and constitutes about 30%, e.g. 25-35%, of the length of the central passage. The forming section terminates in an outlet that discharges directly into the space surrounding the housing and, as distinct from the other embodiments of the die assembly described herein, the central passage includes no distinct outlet section.

A V-shaped groove 95 is formed circumferentially in the external wall of the die 84 with its deepest circumference aligned upstream of the junction 91 between the inlet section and the forming section of the passage. Six conduits 92 about 2 mm in diameter are formed in the wall of the die and extend from the downstream face of the groove towards the central axial passage 86, thereby placing the steam chamber 81*a* in communication with the central passage of the die. The conduits 92 extend in straight lines and converge in the downstream direction towards the axis of the die, at an angle less than 90°, in this case of about 45°, to the axis of the die. The conduits are arranged at equally spaced intervals of 60° around the axis. The outlets of the conduits 92 into the central passage lie on a common circle transverse to the axis of the passage, immediately downstream of the constriction at the junction 91 between the inlet section and forming section, so as to discharge fluid from the steam chamber 81*a* into the central passage 86 of the die in the immediate vicinity of the entrance to the forming section 89. The conduits discharge into the forming section at a distance of about 15% or less (in this example about 14%) of the length of the forming section from the entrance 91. The common circle of the centres of the outlets is space axially from the plane of the entrance by a distance about the same as (about 100% of) the diameter of the conduits.

When the equipment is in use, the downstream end of the mandrel rod 73*b* is inserted into the central passage 86 to define a constriction the form of an annular gap between the mandrel 73 and the cylindrical wall of the passage equal to the desired annular thickness of the tube of fibres. The tip of the mandrel rod lies at the outlet of the forming section, outside the housing 81, at the downstream end of the passage 26. The cured fibre bundle emerging from the forming section is cooled by the ambient atmosphere of the equipment.

In use, superheated steam may be passed from a supply line into the housing 81 via the apertures 83 so as to cure the fibres in the forming section in their tubular configuration. The longer inlet section of the embodiment of FIG. 6D allows more time for the fibres to form around the mandrel within the die, and can result in a more uniform tubular structure. The increased length of the inlet section, and its elongated conical surface may also improve heat transfer through the walls of the die to the fibres. The arrangement of the conduits in the immediate vicinity of the entrance to the forming section enables the steam not only to cure the fibre bundle, but also to plasticise the fibres, to lubricate the passage thereof through the entrance of the forming section, and to reduce drag on the fibres, thereby reducing the risk of the entrance becoming blocked by fibre. The position of the forming section immediately downstream of the interior wall of the steam chamber and discharging into the ambient atmosphere ensures that the rod is cooled immediately after curing in the forming section, which provides stability to the rod and facilitates withdrawal of the formed rod through the die. The downstream, 45° orientation of the angles of the conduits direct the steam jets in the direction of movement of the fibres through the equipment, which assist in advancing the rod through the die assembly. The resulting additional compression of melt blown fibres in the downstream direction by the steam improves the elasticity of the finished rod.

Referring to the embodiment illustrated in FIG. 6E, the overall construction of the housing 81 is similar to that of the embodiment illustrated in FIG. 6D, having a steam chamber 81 with a shorter internal length than that of the embodiments illustrated in FIGS. 6B and 6C.

The overall construction of the die 84 is similar to that of the embodiment illustrated in FIG. 6B, except that the length of the die is reduced to about 60% of that of FIG. 6B. The inlet section 85 of the die extends over about 30%, e.g. 30-35%, of the overall length of the central passage (32% in this case). The conical internal surface of the inlet section 85 tapers in the downstream direction at a larger angle to the central axis of the die than in the embodiment of FIG. 6C, for example an angle of 15-45° degrees, e.g. 20-40 degrees, in this embodiment about 30°, to the central axis of the die.

The forming section 89 lies immediately downstream of the inlet section, wholly within the steam chamber 81, and extends over about the next about 33%, e.g. 30-35%, of the length of the central passage, in this case 32%. The entrance 91 to the forming section, at the junction thereof with the inlet section, lies in the same plane as the upstream inner wall of the steam chamber.

The downstream end of the forming section communicates with the outlet section 88 of the central passage 86, which is also of a uniform circular cross-sectional profile along its length, but of a diameter larger than that of the forming section. defining an internal circumferential profile larger than that of the desired external profile of the finished rod. The outlet section forms the remaining length of the central passage, e.g. about 30-40% of the overall length (in this case 36%). The outlet section of the passage lies almost entirely within the spigot 90 of the die, which is received within the downstream aperture of the closure plate 77.

In this embodiment, heat is transferred by conduction predominantly to the forming section which extends across substantially the whole length of the steam chamber 81a width of the steam chamber. Both the inlet section 85 and the outlet section 88 are cooler than the forming section because their external surfaces are not in direct contact with the steam in the chamber 81a and lie wholly within the walls of the housing 81 or closure plate 77.

When the equipment is in use, the downstream end of the mandrel rod 73b is inserted into the central passage 86 so that the tip of the mandrel rod lies at or near the junction between the forming section 89 and upstream end of the outlet section 88. The forming section 89 and the mandrel 73 cooperate to define an annular gap between the mandrel 73 and the cylindrical wall of the passage equal to the desired annular thickness of the tube of fibres.

The cylindrical external wall of the die 84 is provided with six conduits 92 extending from the external surface of the die 84 to the central axial passage 86, thereby placing the central passage in communication with the steam chamber 81. The conduits are smaller in diameter than those of the preceding embodiments, namely 1.5 mm in diameter. The conduits extend towards the axis of the die in a common radial plane at right angles to the axis of the die, converging in the downstream direction, and are arranged at equally spaced intervals of 60° with one pair of opposed conduits vertical. The common plane of the conduits lies immediately downstream of the junction 91 between the inlet section and the forming section, and the outlets thereof are arranged to discharge steam from the steam chamber 81 into the central passage 86 of the die in the immediate vicinity of the entrance to the forming section 89. The conduits discharge into the forming section beside the entrance and at a distance downstream of less than 5% (in this illustration 2% or 3%) of the length of the forming section from the entrance 91. The common circle of the centres of the outlets is space axially from the plane of the entrance by a distance about the same as (about 100% of) the diameter of the conduits.

In use, superheated steam in the steam chamber 81 passes through the conduits 92 in the die 84 and into contact with the fibres supported on the downstream end of the mandrel 75, heating the fibres to a temperature at which they fuse together at their points of contact, thereby fixing the bundle of fibres into a tubular configuration. The compressive forces on the fibres are at their greatest at the entrance of the forming section 89 and the density of fibre bundle are at their its greatest. By arranging six conduits in the same vertical radial plane immediately downstream of the entrance to the forming section, all six conduits 92 are at 90° to the direction of movement of the bundle of fibres through the die. The jets of steam emerging from the conduits apply effectively the same forces to the fibres in both the upstream and downstream directions and do not therefore significantly oppose the movement of bundle of fibres as it moves through the die. The delivery of steam to the fibres is effective not only in curing the fibre bundle, but also of plasticising the fibres, lubricating the passage thereof through the entrance of the forming section, and reducing drag on the fibres, thereby facilitating the formation of the fibres in a tubular structure around the mandrel, and reducing the risk of the entrance becoming blocked by fibre.

The outlet section 88 has a larger cross-sectional area than the forming section as a result of which the cured fibre rod emerging from the forming section is largely out of contact with the internal walls of the passage 26 as it passes through the outlet section. This rod can therefore cool and stabilise more quickly in the outlet section Referring to the embodiment illustrated in FIG. 6F, the overall construction of the housing 81 is similar to that of the embodiment illustrated in FIGS. 6B and 6C, with a length greater than that of Figures D and E.

The construction of the die 84 is similar to that of the embodiment illustrated in FIG. 6C, save that the inlet section of the die is extended and is modified to incorporate a further set of conduits 96 which are arranged to discharge fluid into the inlet section 85, upstream of the forming section. These additional conduits 96 are smaller in diameter than the embodiments of FIGS. 6B to 6D, in this case 1.5 mm in diameter. The inlet section 85 extends over about 60%, e.g. 55-65%, of the overall length of the central passage. The inlet section therefore is in contact with a substantial part of the length of the steam chamber and is responsible for the transfer of a substantial proportion of the heat to the fibre rod as it advances through the die to the entrance 91 to the forming section.

The internal surface of the inlet section 85 is shaped to reduce the cross section of the bundle of fibres passing therethrough in two stages from a diameter at the upstream end of the inlet section that is equal to or smaller than the downstream outlet from the mandrel support 72, to a diameter at the junction of the inlet section and the forming section equal to the desired external diameter of the finished tubular filter rod. For this purpose, the inlet section comprises an upstream conical section 97, an intermediate cylindrical section 98, and a downstream conical section 99.

The upstream conical section tapers to a diameter about 50% of the diameter of the upstream end of the passage. The junction of the upstream conical section with the intermediate section forms a constriction 100 in the inlet section upstream from the constriction formed at the entrance 91 to the forming section 89. The downstream conical section 99 connects the intermediate section 98 to the forming section 89, creating a constriction in the central passage at the entrance to the forming section.

The upstream conical section 97 may taper at a relatively small angle to the central axis of the die, for example an angle of 9-27°, e.g. 12-20°, in this embodiment 18°, to the central axis of the die. The downstream conical section 99 may taper at a smaller angle to the central axis of the die, for example 3-15° degrees, e.g. 7-12 degrees, in this embodiment 10° degrees to the axis of the central passage.

The forming section 89 extends over about 25%, e.g. 20-30%, of the length of the central passage 86 and is located immediately downstream of the inlet section. The entrance to the forming section, at the junction thereof with the inlet section, lies towards the centre of the steam chamber, between the centre and the downstream face of the housing block. The forming section 89 is of a uniform circular internal cross-sectional profile along its axial length and is about 20% of the overall length of the central passage (in this case 22%).

The downstream end of the forming section 89 communicates with the outlet section 88 of the central passage 86, which is also of a uniform circular cross-sectional profile along its length, but of a diameter larger than that of the forming section, defining an internal circumferential profile larger than that of the desired external profile of the finished rod. The outlet section forms about 20%, e.g. 10-25% of the overall length of the central passage (in this case 18%). The external surface of the outlet section 88 is in the form of a spigot 90 surrounded by a sealing collar 94, and is not therefore directly in contact with the steam chamber.

In this embodiment, heat is transferred by conduction predominantly to the inlet section and the forming section. A substantial length of the inlet section lies with within the steam chamber 81a, and the forming section lies wholly with the steam chamber. The outlet section will be cooler than the forming section because it lies within the closure plate 77, out of direct contact with the steam in the chamber 81a.

A V-shaped groove 95 is formed circumferentially in the external wall of the die 84 with its deepest circumference aligned upstream of the junction between the inlet and forming section of the passage. Four conduits 92 having diameters of about 1.5 mm are formed in the wall of the die and extend from the downstream face of the groove towards the central axial passage 86, thereby placing the steam chamber 81 in communication with the central passage of the die. The conduits 92 extend in straight lines, converging in the downstream direction towards the axis of the die at an angle of about 40° to the axis and arranged at equally spaced intervals of 90° around the axis of the central passage. The outlets of the conduits lie on a common circle transverse to the axis of the passage, immediately downstream of the entrance 91 to the forming section, so as to discharge steam from the steam chamber 81 into the central passage 86 of the die in the immediate vicinity of the entrance 91 to the forming section 89. The common circle of the outlets lies at a distance downstream from the entrance 91 of about 10% of the length of the forming section and is spaced axially from the plane of the entrance by a distance of from 100 and 150% of the diameter of the conduits, in this case 133% thereof.

In addition, the cylindrical external wall of the die 84 surrounding the intermediate section of the inlet is provided with two further conduits 96 extending from the external surface of the die 84 to the central axial passage 86, thereby placing the central passage in communication with the steam chamber 81 upstream of the forming section. The upstream conduits 96 extend towards the axis of the central passage in a common radial plane at right angles to the axis of the die, and are arranged at spaced interval of 180° and aligned vertically. The common plane of the conduits lies immediately downstream of the junction 100 between the upstream conical section 92 and the intermediate section of the inlet 94, at a distance downstream from the junction 100 of 20% or less (in this case 16%) of the length of the intermediate section 98 of the inlet, or less than 15% (in this case 12% of the combined lengths of the intermediate section 98 and the downstream conical section 99. The common circle of the outlets of the further conduits is spaced axially from the plane of the junction 100 by a distance of from 2.5 to 3.5 three times the diameter of the conduits, in this case 300% thereof. The further conduits 96 are therefore arranged to discharge steam from the steam chamber 81 into the central passage 86 of the die in the immediate vicinity of the constriction at junction 100, by the entrance to the intermediate section 98 of the inlet.

The number and sizes of conduits at the entrance to the forming section and the further conduits in the inlet section are selected to deliver controlled amounts of steam to the two sections of the die. Generally, smaller amounts of steam will be required in the inlet section than in the forming section. Hence the numbers and sizes of the conduits at each section may differ between the two locations.

When the equipment is in use, the downstream end of the mandrel rod 73c is inserted into the central passage 86 as illustrated in FIG. 6F to define an annular gap between the mandrel 73 and the cylindrical wall of the forming section equal to the desired annular thickness of the tube of fibres. The tip of the mandrel rod lies at or near the junction between the forming section 89 and upstream end of the outlet section 88, in this case immediately upstream of the outlet from the forming section In use, superheated steam may be passed from a supply line into the housing 81 via the apertures 83, as described with reference to the other embodiments illustrated, so as to cure the fibres in the forming section in their tubular configuration. The longer inlet section of the embodiment of FIG. 6D allows more time for the fibres to form around the mandrel, and can result in a more uniform tubular structure. The provision of an additional constriction in the inlet section, upstream of the forming section facilitates the compression of the fibres and distributes the compressive forces more evenly along the length of the inlet section. The passage of the fibre bundle through the inlet section is further facilitated by the introduction of steam at or near the upstream constriction 100 through the additional conduits between the two conical sections of the inlet section. Steam introduced to the fibres at this point, upstream of the forming section, pre-heats and plasticises the fibres prior to the forming stage, lubricates the bundle prior to entry into the forming section, thereby reducing drag.

The positioning of the forming section immediately downstream of the interior wall of the steam chamber ensures that the rod is cooled immediately after curing in the forming section, which provides stability to the rod and facilitates withdrawal of the firmed rod through the die. The downstream orientation of the angles of the conduits 92 direct the steam jets in the direction of movement of the fibres through the equipment, which assist in advancing the rod through the die assembly. Since the four conduits 92 are at 40° to the direction of movement of the bundle of fibres through the die, the jets of steam emerging from the conduits apply forces to the fibres in the downstream direction and relatively little or no force in the upstream direction, which would be in opposition to the bundle of fibres as it moves through the die. The application of the compressive force to the fibres in the downstream direction improves the elasticity of the finished rod, particularly when the fibres are produced by a melt blowing process.

The outlet section 88 has a larger cross-sectional area than the forming section as a result of which the cured fibre rod emerging from the forming section largely is out of contact with the internal walls of the passage 26 as it passes through the outlet section. In this embodiment, the rod can therefore cool and stabilise more quickly in the outlet section.

Use and Operation of Equipment and Manufacturing Process

The use of the equipment in a continuous manufacturing process for producing rods of fibrous material will now be described. The process described broadly comprises gathering fibres into an elongated bundle, advancing the bundle through a constriction that defines a desired circumferential profile for the bundle of fibres, and introducing in to the bundle a treatment fluid for curing the fibres in the immediate vicinity of the constriction gathering the fibres into a bundle, and also in a direction that is not opposed to the direction of movement of the bundle of fibres as it is advanced through the die towards the outlet of the passage.

In the fibre supply module 1, the melt blowing head 10 is supplied with molten polymer and hot gas. The molten polymer emerges as a liquid through the array of jets 13 and is blown by the hot air into thin streams which solidify to form small diameter fibres 15 and become entrained in the gas stream.

The melt blowing head may be configured to produce mono-component fibres from a single polymer material or bi-component fibres having a core formed from a first polymer encased in a sheath formed from a different polymer. For the production of tubular filter rods, mono-component fibres may for example be formed from polyester, polyamide, ethyl vinyl acetate, polyvinyl alcohol or cellulose acetate, optionally incorporating other materials for modifying the properties of the polymer, for example a plasticiser such as triacetin. Bi-component fibres may be formed from any combination of compatible polymers, having for example, a core of polypropylene and a sheath of cellulose acetate, optionally incorporating a triacetin plasticiser.

Using air as the blowing gas, the die head is typically positioned 25-65 cm above the upper run of the conveyor belt 29 and is operated with an air temperature of 250-350° C., e.g. 300-320° C., an air flow rate of 500-600 cubic feet or 14,000-17,000 litres per minute, and a polymer throughput of 0.3-0.5 grams per jet hole per minute. The resulting fibres typically have a diameter of 5-10 microns, e.g. about 7 microns and can be gathered to form a tubular filter rod 5 having an external diameter of 5-10 mm, for example 7 to 9 mm, e.g. about 8 mm (particularly 7.7 mm), an internal diameter of 1 to 6 mm, for example 2 to 5 mm and a weight of from 5 mg per millimetre length of the rod, typically from 8 to 12 mg/mm e.g. about 10 mg/mm.

The stream of gas and entrained fibres 15 is directed on to the conveyor 24, and the fibres gather together in an entangled mat on the upper run of the conveyor belt 29 The conveyor 24 is operated to move the belt 29 in the anti-clockwise direction as seen in FIG. 2, thereby moving fibres out of the gas stream and downstream towards the forming module 3.

The resulting web 30 of gathered fibres is drawn continuously into and through the forming cone 50. FIG. 7A illustrates the generally rectangular cross-sectional shape of the web of fibres 15 immediately before it enters the forming cone 50. For example, the web may be 150 mm in width and 20 mm in thickness or "loft". As the web travels through the forming cone, the fibres 15 are guided and compressed into a bundle 32 of increasingly cylindrical shape. The cross-sectional shape of the web at a point about half way thought the cone 50, indicated by the section line 7B in FIG. 1, is illustrated schematically in FIG. 7B. At this point, as the web advances through the forming cone, the longitudinal edges of the web are compressed towards the central axis of the forming cone, and the fibres are moved towards and over each other both laterally and vertically in a complex folding operation to lie on either side of and below the divider rib 59 as they approach the tubular outlet 57, which is of circular radial cross-section.

Within the forming cone, the density of the fibres within the bundle increases progressively along the axis of the cone from a relatively low density at the inlet to a higher density at the outlet 57. The cross-sectional density of the bundle is not uniform. At each point along the length of the bundle, the fibre density increases in the radial direction from a void or low density region at the centre of the bundle to a higher density region at the periphery of the bundle.

As the web of fibres advances through the forming cone, the divider rib 59 separates the fibres in the upper part of the bundle to form a cleft 35 along the length of the bundle. In the embodiment illustrated, the divider rib forms a cleft that penetrates up to and marginally beyond the centre of bundle, making the depth of the cleft between 50 and 60% of the diameter of the bundle, e.g. about 55%.

Figure 7C:
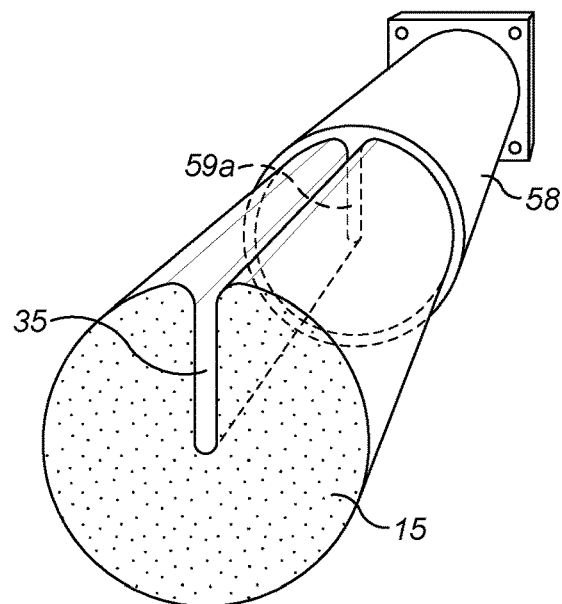

As illustrated in FIG. 7C, when the bundle of fibres 15 emerges from the outlet extension piece 58 of the forming cone, its envelope is cylindrical in shape with a diameter of about 15-25%, e.g. about 20% of the width of the web as it enters the forming cone and is formed with a cleft 35 along its length.

Figure 7D:
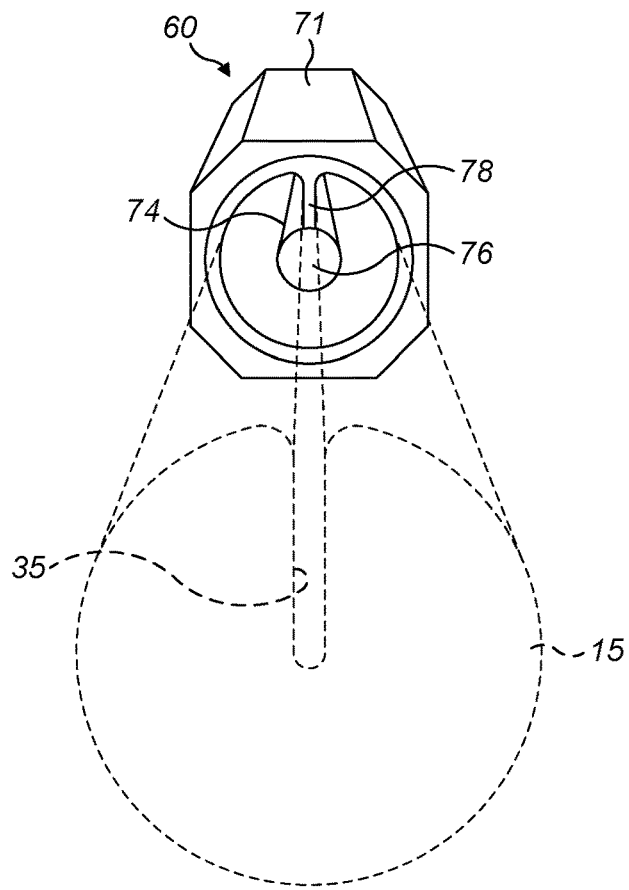

The bundle then passes downstream from the forming cone into the mandrel assembly 60. FIG. 7D illustrates schematically, looking downstream, the configuration of the bundle of fibres 15 as it enters the mandrel assembly, the envelope of the bundle being indicated in broken lines. The divider plate 78 registers with the cleft 35 that has been formed in the bundle of fibres upstream by the divider in the forming cone, and hold the cleft open as the fibres pass on either side of and below the divider plate. The boss 76 on the tip of the upper mandrel rod 73a initiates an opening movement of the fibres at the centre of the bundle to make way for the upper mandrel rod 73a, which inserts into the centre of the bundle and expands the fibres to form a central axial passage 36 in the bundle of fibres.

Figure 7G:
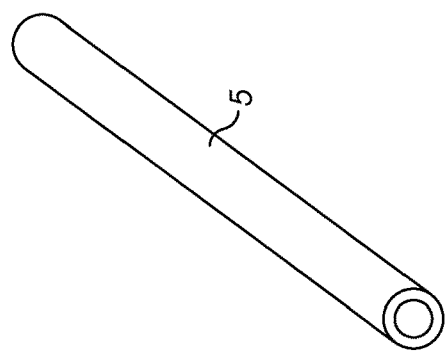
Figure 7F:
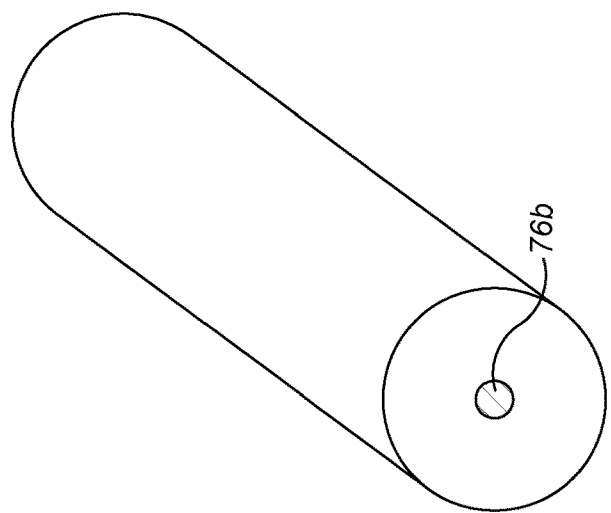
Figure 7E:
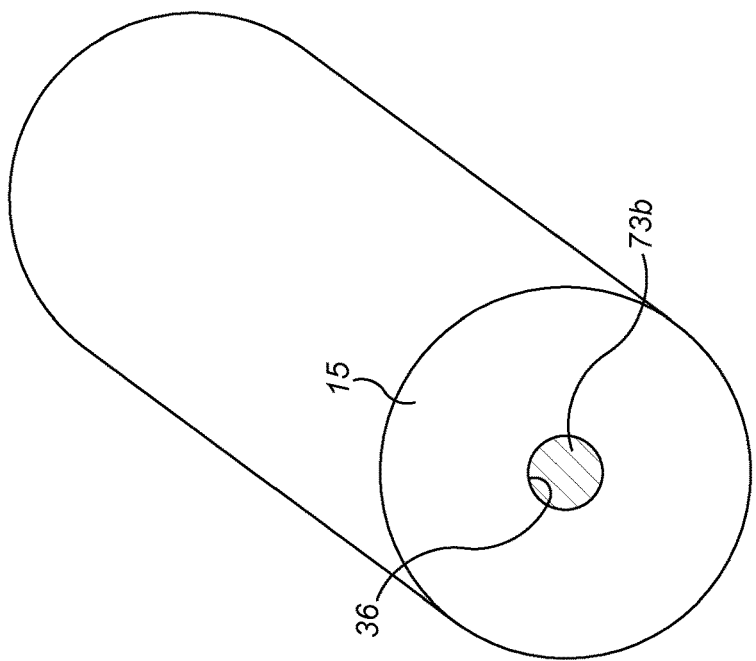

As the bundle advances over the upper mandrel rod downstream from the divider plate 78 and on to the lower mandrel rod 73b, the cleft in the fibre bundle begins to close around the mandrel and the fibres form a continuous peripheral layer around the wider diameter segment of the lower mandrel rod 73b, as illustrated in FIG. 7E. At this point, the central passage 36 has a diameter larger than the desired internal diameter of the finished tube, e.g. 10%, 15%, 20%, or 30% larger.

As the bundle advances downstream out of the mandrel support 72 and the casing 71 towards the die assembly 80, it passes from the wider-diameter segment 73b of the upper mandrel rod on to the smaller-diameter segment 73c of the lower mandrel rod, which has a diameter corresponding to the desired internal diameter of the finished tubular rod. As the bundle approaches and enters the die 84, the tapered socket 85 of the die 84 compresses the bundle of fibres around the downstream segment 73c of the mandrel, completing the closure of the cleft, and producing a tubular structure about the mandrel with an external diameter corresponding to the desired external diameter of the finished tube. FIG. 7F illustrates the configuration of the bundle of fibres at the point of entry into the socket 85 of the die, and FIG. 7G illustrates the configuration of the tubular rod immediately downstream of the die 84, after passing over the downstream end of the mandrel. Typically, the external diameter of the rod will be 10-20% e.g. 15% of the diameter of the bundle of fibres at the downstream end of the mandrel assembly illustrated in FIG. 7E. The tubular structure emerging from the die has the desired internal and external diameters of the finished product. Tubes of different sizes and different combinations of internal and external diameters may be produced by using dies of different internal diameters in combination with mandrels of different diameters.

As the bundle travels through the die assembly 80 whilst supported by the mandrel, it is contacted under pressure, for example at a pressure of 1-3 bar, typically about 1.5 bar, with superheated steam produced for example by heating steam to a temperature in the range 150-200° C. This treatment causes the fibres to bond together at their points of contact, thereby forming a bonded, self-supporting structure in the form of a tubular rod 5, as illustrated in FIG. 7G.

If a mandrel assembly constructed in accordance with FIGS. 5D and 5E is used, treatment fluid may be passed into the mandrel 73 and applied to the fibre bundle as it passes over the mandrel, and as the bundle closes around the mandrel, thereby pre-conditioning the bundle of fibres and facilitating compression around the lower mandrel rod 73b as it enters the die 84.

The rod 5 may then be drawn from the mandrel and then through further processing equipment for example an air block, to remove excess water from the rod, and a cutting machine which severs the rod into consecutive tubular segments of a desired length, as illustrated in FIG. 7F.

In the embodiments of the process disclosed herein, the fibres are compressed in a die to the density required in the finished product and cured to maintain the desired stability of the product. This is achieved by passing the fibres through a constriction in the die and, in order to facilitate the compression and curing of the fibres, introducing steam or other treatment fluid for curing the fibres into the bundle the fibres in the immediate vicinity of the constriction. Introduction of the fluid in the same direction of movement as the fibre bundle or at an angle no greater than 90° thereto also facilitates compression and shaping of the bundle of fibres and movement of the fibres through the constriction. At directions materially greater than 90°, a component of the force exerted on the fibre by the bundle would oppose the movement of the fibre bundle through the constriction and will oppose compression and shaping of the fibre bundle. The introduction of the fluid at this point not only cures the fibres, but also facilitates the compression in the constriction, avoiding blockages. The conditions under which heat and compressive energy are applied to the fibres as the fibre bundle passes through the die assembly, together with the treatment fluid, may be controlled by the design of the die assembly. In particular, the configuration of inlet section, forming section and outlet section, if any, can be varied and selected by routine experimentation for optimum delivery of heat for the fibres used.

For the formation of tubes, a mandrel may be introduced into the centre of the fibre bundle, with the objective of forming a central support around which a tubular structure can be formed. The mandrel may include a passage for delivering a treatment fluid to the fibre bundle as the bundle passed over it. In the embodiments described herein, the formation of a cleft in the fibre bundle before it is passed over the mandrel controls and stabilises the movement of the fibres into a tubular configuration, facilitating the formation of a tubular structure, and reducing the incidences of collapse of the tubular structure.

The invention claimed is:

1. A die assembly for forming a bundle of fibers into a rod, the die assembly comprising:
   a die having a body defining a passage therethrough for conducting the bundle of fibers through the die from an inlet to an outlet, the die having an inlet section in the form of a socket comprising a sealing collar on its external surface, the passage through the inlet section taperings in a downstream direction and communicating at its downstream end with a forming section, the die further comprising an outlet section comprising a spigot, wherein the passage comprises a constriction at the entrance to the forming section at a juncture between the inlet section and the forming section in the passage, the constriction being shaped to form the fibers of the bundle into a desired configuration as the bundle passes through the die, and at least one conduit in the body arranged to discharge a heated treatment fluid into the forming section immediately downstream of the entrance to the constriction and in a direction that is not opposed to a direction of movement of the bundle of fibers through the die;
   a housing defining a chamber into which the heated treatment fluid is introduced, the chamber being configured so that heat from the heated treatment fluid is conducted from the chamber predominantly to the forming section and to a portion of the inlet section through the body of the die, the housing comprising an upstream face and an aperture formed therein in which the socket of the inlet section of the die is received with the first sealing collar on the external surface of the socket sealed against an inner surface of the upstream face of the housing, the housing further comprising a closure plate to close a downstream face of the housing, the closure plate having an aperture therein in which the outlet section of the die is received with the spigot sealed against an inner surface of the closure plate;
   wherein the at least one conduit in the body communicates between the chamber and the passage for the introduction of said heated treatment fluid from the chamber into said passage,
   the arrangement being such that the heat from the treatment fluid introduced into the passage, and the heat from the treatment fluid in the chamber and conducted through the body of the die to the inlet section and the forming section, cures the bundle of fibers introduced into the passage.

2. A die assembly according to claim 1, wherein the conduit is arranged to direct the fluid into the passage in a direction no greater than 90° to the direction of movement of the bundle of fibers through the die.

3. A die assembly according to claim 1, wherein the passage comprises an inlet section that includes the inlet to the passage, and a forming section that includes the constriction, and the entrance to the constriction is at a junction between the inlet section and the forming section.

4. A die assembly according to claim 1, wherein the passage comprises an inlet section that tapers towards the constriction.

5. A die assembly according to claim 1, wherein the passage comprises an outlet section which includes the outlet of the passage and which communicates with a section of the passage that includes the constriction.

6. A die assembly according to claim 5, wherein the outlet section defines a circumferential profile larger than that defined by the constriction.

7. A die assembly according to claim 1, wherein the die is configured to conduct heat from the chamber to the passage through the body of the die such that heat is transferred in selected proportions to adjacent sections of the passage.

8. A die assembly according to claim 7, configured to transfer heat to the passage primarily through a section of the passage that includes the constriction.

9. A die assembly according claim 7, configured to transfer heat to the passage primarily through sections of the passage that include the constriction and the inlet.

10. A die assembly according to claim 7, configured to transfer heat to the passage primarily through sections of the passage that include the constriction and the outlet.

11. A die assembly according to claim 7, wherein relative lengths of sections of the die are selected to provide transfer the heat to the sections in desired proportions.

12. A die assembly according to claim 1, further comprising a mandrel constructed to be positioned in a path of the bundle of fibers to form the bundle of fibers into a tube.

13. A die assembly according to claim 12, wherein the mandrel is mounted in a mandrel assembly adjacent the die and constructed to project therefrom into the passage in the die, and the mandrel assembly is configured to direct the bundle of fibers on to the mandrel and into the passage in the die.

14. A die assembly according to claim 12, wherein the passage has a wall and the constriction in the die is formed between the mandrel and the wall of the passage.

15. A die assembly according to claim 12, wherein the mandrel defines a conduit for delivering a treatment fluid to the fiber bundle as the bundle passes over the mandrel.

16. A die assembly according to claim 15, wherein the conduit in the mandrel is arranged to deliver treatment fluid to the bundle of fibrous material on the mandrel in a direction that is not opposed to a direction of movement of the bundle over the mandrel.

17. A die assembly according to claim 16, wherein the conduit in the mandrel is arranged to discharge fluid into the fiber bundle at an acute angle to the direction of movement of the bundle.

18. A die assembly according to claim 1, further comprising further conduits in the die through which a fluid may be introduced into the passage for treating fibers therein, wherein the further conduits are constructed and arranged to discharge fluid into an inlet section of the passage upstream of the constriction.

19. A die assembly according to claim 18, wherein the inlet section includes an upstream section and a downstream section of smaller cross-sectional area, and the further conduits are constructed and arranged to discharge fluid into a passage in a vicinity of a junction between the upstream and downstream sections.

20. Equipment for forming a bundle of fibers into a rod comprising gathering equipment constructed to receive a continuous supply of fibers and to gather the fibers into a bundle as the fibers advance through the equipment, and a die assembly according to claim 1 arranged to receive the bundle of fibers and to form the bundle into a rod.

21. Equipment according claim 20, further comprising a divider arranged in the path of the bundle of fibers through the equipment and constructed to from a cleft along a length of the bundle as the bundle advances towards a mandrel.

22. Equipment according to claim 21, further comprising a forming cone having an inlet for receiving the bundle of fibers, an outlet from which a web of fibers may be withdrawn as a bundle and defining a longitudinally extending passage of tapering configuration between the inlet and the outlet, and the divider comprises a projection in the passage of the forming cone extending between the inlet and the outlet.

23. Equipment according to claim 21, wherein the mandrel is mounted in a tubular casing configured to receive the bundle of fibers, and the divider comprises a support connecting the mandrel to the casing.

* * * * *